(12) United States Patent
Reeves et al.

(10) Patent No.: US 8,290,549 B2
(45) Date of Patent: Oct. 16, 2012

(54) MOBILE COMMUNICATION DEVICE HAVING ROTATABLE MEMBER

(75) Inventors: Jim Reeves, Twyford (GB); David Ryan Walker, Waterloo (CA); Steven Henry Fyke, Waterloo (CA)

(73) Assignee: Research In Motion Limited, Waterloo (CA)

( * ) Notice: Subject to any disclaimer, the term of this patent is extended or adjusted under 35 U.S.C. 154(b) by 38 days.

(21) Appl. No.: 12/816,552

(22) Filed: Jun. 16, 2010

(65) Prior Publication Data

US 2011/0312392 A1 Dec. 22, 2011

(51) Int. Cl.
H04M 1/00 (2006.01)

(52) U.S. Cl. .................... 455/575.3; 455/575.1

(58) Field of Classification Search .............. 455/550.1, 455/575.1–575.5
See application file for complete search history.

(56) References Cited

U.S. PATENT DOCUMENTS

| | | | |
|---|---|---|---|
| 5,103,376 A | | 4/1992 | Blonder |
| 5,255,214 A | | 10/1993 | Ma |
| 5,268,817 A | * | 12/1993 | Miyagawa et al. ...... 361/679.07 |
| 5,276,589 A | | 1/1994 | Bartlett et al. |
| 5,410,447 A | | 4/1995 | Miyagawa et al. |
| 5,548,478 A | | 8/1996 | Kumar et al. |
| 5,644,469 A | | 7/1997 | Shioya et al. |
| 5,706,167 A | * | 1/1998 | Lee ........................ 361/679.55 |
| 5,900,848 A | | 5/1999 | Haneda et al. |
| D416,003 S | | 11/1999 | Schiefer et al. |
| 6,005,767 A | | 12/1999 | Ku et al. |
| 6,266,236 B1 | | 7/2001 | Ku et al. |
| 6,434,371 B1 | | 8/2002 | Claxton |
| 6,532,147 B1 | | 3/2003 | Christ, Jr. |
| 6,556,435 B1 | | 4/2003 | Helot et al. |
| 6,827,409 B2 | | 12/2004 | Michael |
| 6,903,927 B2 | | 6/2005 | Anlauff |
| 7,079,872 B2 | | 7/2006 | Khalid et al. |
| 7,140,074 B2 | | 11/2006 | Han et al. |

(Continued)

FOREIGN PATENT DOCUMENTS

EP 1 670 218 6/2006

(Continued)

OTHER PUBLICATIONS

Print out of photograph and description of Kohjinsha SX-Series as retrieved from http://www.engadget.com/2008/06/23/kohjinsha-sx-series-convertible-tablet-edges-out-ofumpc-territo/ on Sep. 1, 2009.

(Continued)

Primary Examiner — Ajit Patel
(74) Attorney, Agent, or Firm — Novak Druce + Quigg LLP

(57) ABSTRACT

A mobile communication device is provided which includes at least one hinge mechanism pivotably coupled to a top member and to a base member such that the top member can be moved between an opened and a closed position. In the closed position, display and/or interface elements may be inside the device and adjacent to the base member, thereby being inaccessible and protected. In the opened position, the display and/or interface elements may be accessible. A biasing mechanism may drive a portion of the movement between the opened and closed positions. The top member and the base member may be biased or restricted such that there is substantially no separation between the top member and the base member during movement between the opened and closed positions.

19 Claims, 14 Drawing Sheets

U.S. PATENT DOCUMENTS

| | | | |
|---|---|---|---|
| 7,197,346 | B2 | 3/2007 | Eromaki et al. |
| 7,221,562 | B2 | 5/2007 | Song |
| 7,277,275 | B2 | 10/2007 | Won et al. |
| 7,414,834 | B2 | 8/2008 | Ukonaho et al. |
| 7,418,275 | B2 | 8/2008 | Yiu |
| 7,512,426 | B2 | 3/2009 | Maatta et al. |
| 7,599,181 | B2 | 10/2009 | Chuang et al. |
| 7,844,915 | B2 | 11/2010 | Platzer et al. |
| 2002/0038493 | A1 | 4/2002 | Ko et al. |
| 2002/0126441 | A1 | 9/2002 | Kuo |
| 2003/0197745 | A1 | 10/2003 | Daly |
| 2005/0083644 | A1 | 4/2005 | Song |
| 2005/0099533 | A1 | 5/2005 | Matsuda et al. |
| 2005/0200608 | A1 | 9/2005 | Ulla et al. |
| 2006/0012563 | A1 | 1/2006 | Fyke et al. |
| 2006/0038795 | A1 | 2/2006 | Lee |
| 2006/0071916 | A1 | 4/2006 | Jeun et al. |
| 2006/0148543 | A1 | 7/2006 | Hunt |
| 2007/0086155 | A1 | 4/2007 | Chen et al. |
| 2007/0183123 | A1 | 8/2007 | Chuan et al. |
| 2008/0000048 | A1 | 1/2008 | Petrella |
| 2008/0044007 | A1 | 2/2008 | Fujii |
| 2008/0068786 | A1 | 3/2008 | Cheng et al. |
| 2008/0287167 | A1* | 11/2008 | Caine ............... 455/575.1 |
| 2009/0048006 | A1* | 2/2009 | Liao et al. ............ 455/575.3 |
| 2009/0061956 | A1 | 3/2009 | Matsuoka |
| 2009/0061959 | A1 | 3/2009 | Cheng et al. |
| 2009/0147458 | A1 | 6/2009 | Wang |
| 2009/0227301 | A1 | 9/2009 | Lindvall |
| 2010/0151924 | A1* | 6/2010 | Amano ............... 455/575.4 |
| 2010/0232102 | A1 | 9/2010 | Walker et al. |
| 2010/0296232 | A1* | 11/2010 | Yeh et al. ............ 361/679.01 |
| 2010/0299873 | A1 | 12/2010 | Song |
| 2011/0038108 | A1 | 2/2011 | Chang |
| 2011/0122553 | A1 | 5/2011 | Griffin et al. |
| 2011/0221319 | A1* | 9/2011 | Law et al. ............... 312/325 |

FOREIGN PATENT DOCUMENTS

| | | |
|---|---|---|
| EP | 1670218 A1 | 6/2006 |
| EP | 1699208 | 9/2006 |
| EP | 1760998 | 3/2007 |
| EP | 1 835 703 A1 | 9/2007 |
| EP | 1 838 072 A2 | 9/2007 |
| EP | 2031839 | 3/2009 |
| EP | 2346231 | 7/2011 |
| JP | 2004235687 | 8/2004 |
| JP | 2004235687 A | 8/2004 |
| KR | 1020060076338 | 6/2006 |
| WO | 2008/056019 A1 | 5/2008 |
| WO | WO2008056019 A1 | 5/2008 |
| WO | 2009/038375 A2 | 3/2009 |
| WO | 2009/099275 A2 | 8/2009 |
| WO | 2009099275 A2 | 8/2009 |

OTHER PUBLICATIONS

Print out of http://lcwprops.com/upload/catalog/Icw_4718.jpg, accessed at least on Sep. 1, 2009.

Print out of a photograph of Electronic Rolodex w/Auto Dialfirst retrieved from http://www.j-syscomputers.com/invtypageALLhtm on Sep. 1, 2009.

Print out of photographs of Flip mobile phone SIBA E38+ with Rotate 180 degrees camera (dual sim phone) retrieved from <http://www.alibaba.com/seo/buySeoLead.htm?SearchText=Flip%20mobile%20phone%20SIBA%20E381+%20with%20Rotate%20180%20degrees%20camera%20&IndexArea=product_en>, accessed on May 12, 2009.

Extended European Search Report in respect of European Patent Application No. 09180013.6 dated Jun. 14, 2010.

Extended European Search Report in respect of European Patent Application No. 10150910.7 dated Sep. 9, 2010.

Partial European Search Report in respect of European Patent Application No. 10150910.7 dated Jan. 6, 2010.

Extended European Search Report in respect of European Patent Application No. 10166228.6 dated Dec. 23, 2010.

English translation of Patent Abstract of Japan, Publication No. 2004235687.

Print out of <http://www.ecplaza.net/tradeleads/sellers/4335838/friction_stay_hinge.html>, accessed at least on May 26, 2009.

Picture and description of MPH Cell Phone Hinge taken from <www.sugatsune.net/Industrial_Hardware_Components/Products/productdetails.cfm?CATID=7&SUBCATID=4&PRODUCTID=MPH>, accessed at least on May 26, 2009.

Picture and description of HG-JHW Soft-Close Dampering Hinge taken from <www.sugatsune.net/Industrial_Hardware_Components/Products/productdetails.cfm?CATID=7&SUBCATID=4&PRODUCTID=HG-JHW>, accessed at least on May 26, 2009.

Picture and description of HG-JH210 Lift Assist Hinge taken from <www.sugatsune.net/ Industrial_Hardware_Components/Products/productdetails.cfm?CATID=7&SUBCATID=4&PRODUCTID=MPH>, accessed at least on May 26, 2009.

Extended EP Search Report for EP 11162190.0 dated May 6, 2011.

"Extended European Search Report" issued from EP 11162200.7 on Jul. 7, 2011.

Printout of photograph of Lenovo ThinkPad X61 tablet PC as retrieved from <http://techcrunch.com/2007/05/18/Ienovo-tablet-pc-with-santa-rosa/> (retrieved Dec. 16, 2010).

Printout of photograph and related news article of Dell Inspiron Duo convertible tablet as retrieved from <http://techreport.com/discussions.x/20012> (dated Nov. 18, 2010).

Printout of photograph of Dell Duo tablet as retrieved from <http://netbookreview.co.uk/wp-content/uploads/2010/11/dell-duo.jpg> (retrieved Dec. 3, 2010).

Printout of <http://www.itproportal.com/media-site/photos/dell_inspiron_duo.png> (retrieved Dec. 16, 2010).

Printout of <http://pencomputing.com/images/TPCEvosequence.jpg> (retrieved Dec. 9, 2010).

Printout of <http://www.ubergizmo.com/photos/2007/1/oqo_468.jpg> (retrieved Dec. 16, 2010).

Printout of article regarding Samsung GloriaWindows 7 tablet as retrieved from <http://www.engadget.com/2010/12/08/samsung-gloria-to-be-a-10-inch-windows-7-tablet-with-slide-out-k/> (dated Dec. 8, 2010).

Printout of article titled "Slide out that Keyboard on Your iPhone 4" as retrieved from <http://www.yourtechreport.com/2010/11/18/slide-out-that-keyboard-on-your-iphone-4/> (dated Nov. 18, 2010).

Printout of article regarding Boxwave Keyboard Buddy as retrieved from <http://9to5mac.com/2010/11/17/boxwaves-keyboard-buddy-cases-gives-your-iphone-4-physical-keys/> (dated Nov. 17, 2010).

Printout of photographs of Phone with Full Slide-Out Keyboard as retrieved from <http://tradestead.com/images-phone-full-slide-out-keyboard-3-2-intuitive-touch-screen-wifi-recommend_p10990_n2.html> (retrieved Dec. 16, 2010).

Printout of article regarding Intel UrbanMax concept as retrieved from <http://www.engadget.com/2008/08/20/intels-urbanmax-concept-device-demonstrated-on-video/> (dated Aug. 20, 2008).

Printout of article entitled "EKING introduces a portable tablet with a slide-out keyboard" as retrieved from <http://liliputing.com/2010/07/eking-introduces-a-portable-tablet-with-a-slide-out-keyboard.html> (posted Jul. 22, 2010).

Printout of article entitled "Eking E5 UMPC brings tilting, sliding 5-inch display" as retrieved from <http://techfused.com/eking-e5-umpc-brings-tilting-sliding-5-inch-display> (dated Aug. 21, 2010).

Printout of article of entitled "EKING's Latest Portable Tablet With a Slide-Out Keyboard" as retrieved from <http://www.laptopinyo.com/tag/keyboard> (dated Jul. 23, 2010).

Printout of article entitled "Eking M5 side slide MID arrives" as retrieved from <http://www.clonedinchina.com/2010/08/eking-m5-side-slide-mid-arrives.html> (dated Aug. 21, 2010).

Printout of photograph of Eking S515 Slider UMPC retrieved from <http://www.flickr.com/photos/umpcportal/4162816984/in/photostream/> (photo taken Dec. 6, 2009).

Printout of photograph and related description of vCoach folding desk stand as retrieved from <http://www.vcoach.net/VC/general/products/accessories.asp> (retrieved Dec. 9, 2010).

Printout of photograph and related description of of Rocketfish Adjustable Noebook Stand as retrieved from <http://www.thisnext.com/item/AD19BBDB/EDCAD0F5/Rocketfish-Adjustable-Notebook> (retrieved Dec. 9, 2010).

Printout of <http://www.assistiveit.co.uk/images/laptop%20stand.jpg> (retrieved Dec. 9, 2010).

Printout of photograph and related description of Portabook as retrieved from <http://laptoppimp.com/laptop-accessories/the-portabook-laptop-stand/> (retrieved Dec. 9, 2010).

Printout of drawing and related article of Apple Convertible Tablet Patent as retrieved from <http://www.gottabemobile.com/2010/12/01/apple-convertible-tablet-patent-shows-a-unique-apin-on-familiar-form-factor/> (dated Dec. 1, 2010).

Printout of <http://laptoping.com/wp-content/acer_travelmate_c210_1.gif> (retrieved Dec. 16, 2010).

Printout of <http://pdab.net/img/clio_c1050.jpg> (retrieved Dec. 3, 2010).

Printout of <http://www.smartphonemag.com/_archives/Jan00/images/Vadem_Clio_group.jpg> (retrieved Dec. 3, 2010).

Printout of <http://thetabletpc.net/Photos-WinHEC/PICT0564.JPG> (retrieved Dec. 16, 2010).

Printout of a picture of iPad Keyboard Dock retrieved from <http://reviews.cnet.com/keyboards/apple-ipad-keyboard-dock/4505-3134_7-34058880.html?tag=content;get-selector#reviewPage1>, posted on Apr. 20, 2010.

Printout of <http://www.tabletpc2.com/Review-HPTC1100.htm>, posted in Mar. 2004.

Printout of <http://www.mobileburn.com/review.jsp?Id=2917>, first accessed at least on May 12, 2009.

Extended European Search Report issued from EP 11162200.7 on Jul. 7, 2011.

Extended European Search Report in respect of European Patent Application No. 11177125.9 dated Jan. 26, 2012.

Extended European Search Report in respect of European Patent Application No. 11177100.2 dated Jan. 3, 2012.

Non-Final Office Action in respect of U.S. Appl. No. 12/687,947, dated Dec. 14, 2011.

Partial European Search Report in respect of European Patent Application No. 11177125.9 dated Nov. 11, 2011.

English machine translation of JP 2004235687, which was published Aug. 19, 2004, obtained from <http://www4.ipdl.inpit.go.jp/Tokujitu/tjsogodben.ipdl?N0000=115>; retrieved on Aug. 22, 2011.

* cited by examiner

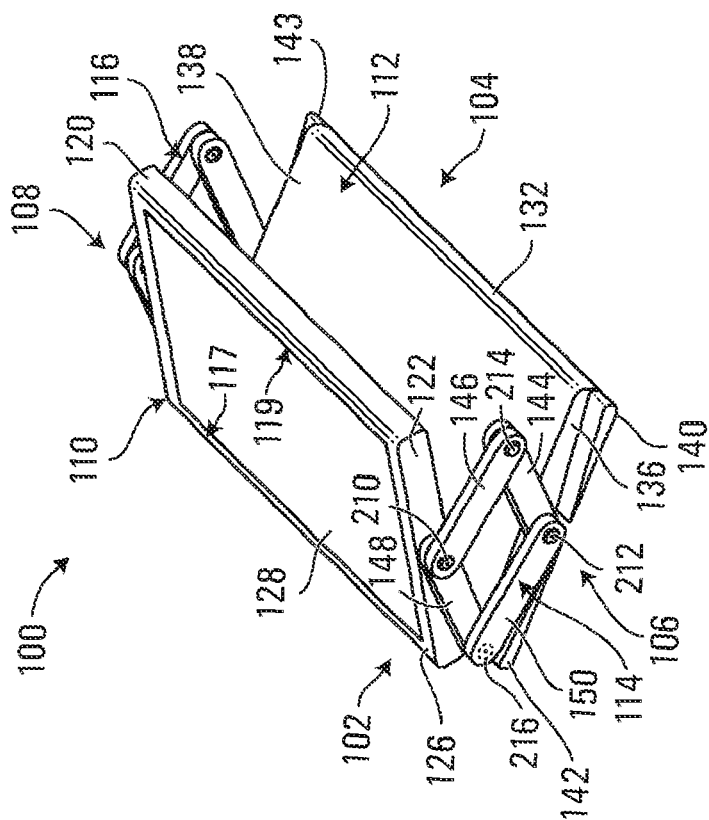
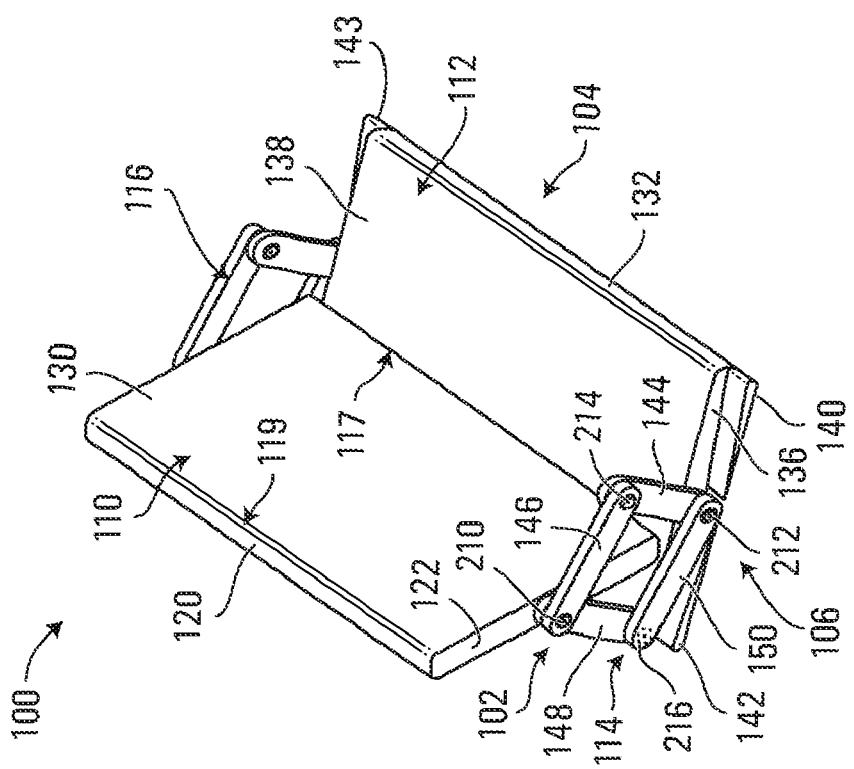

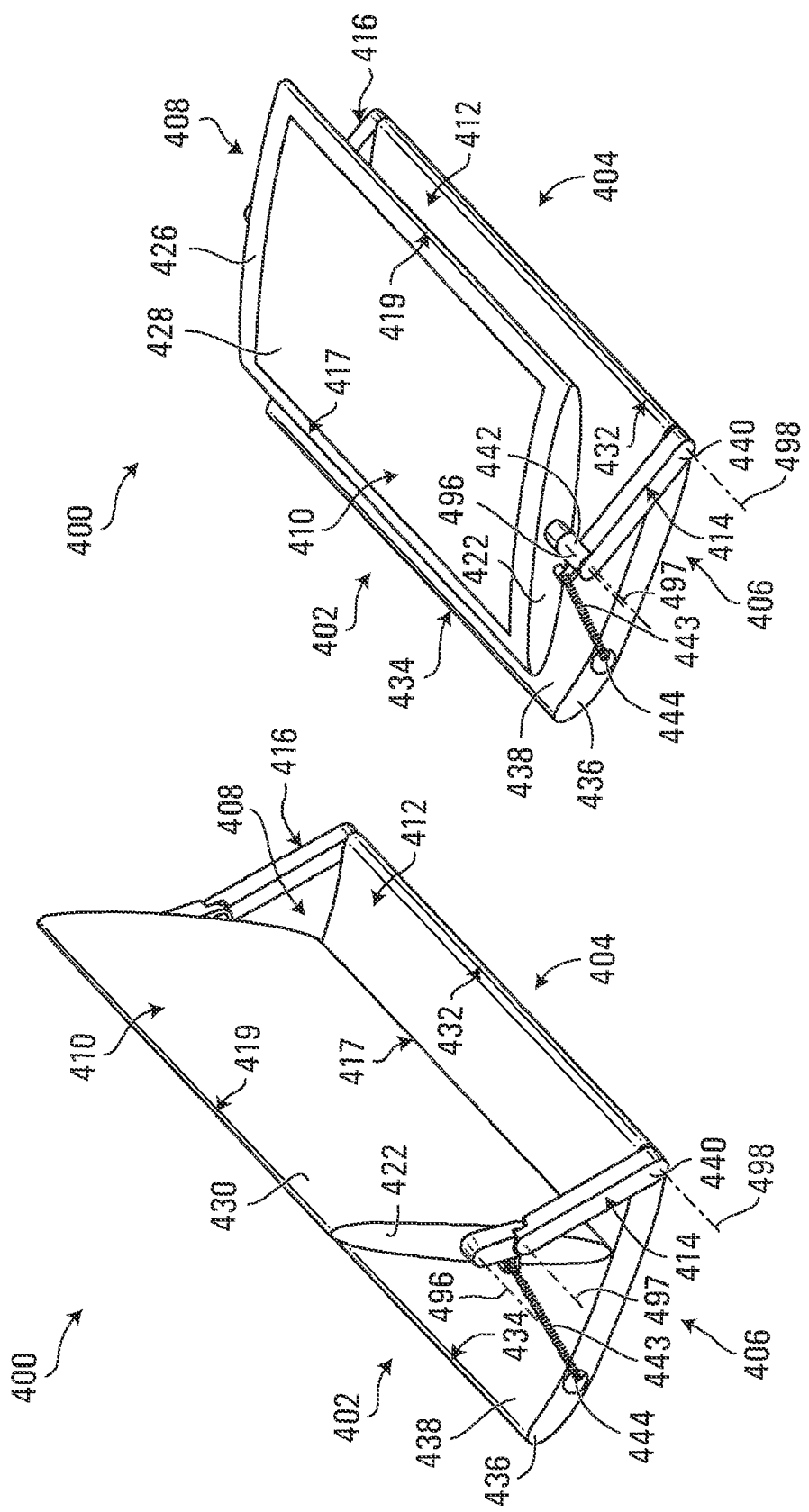

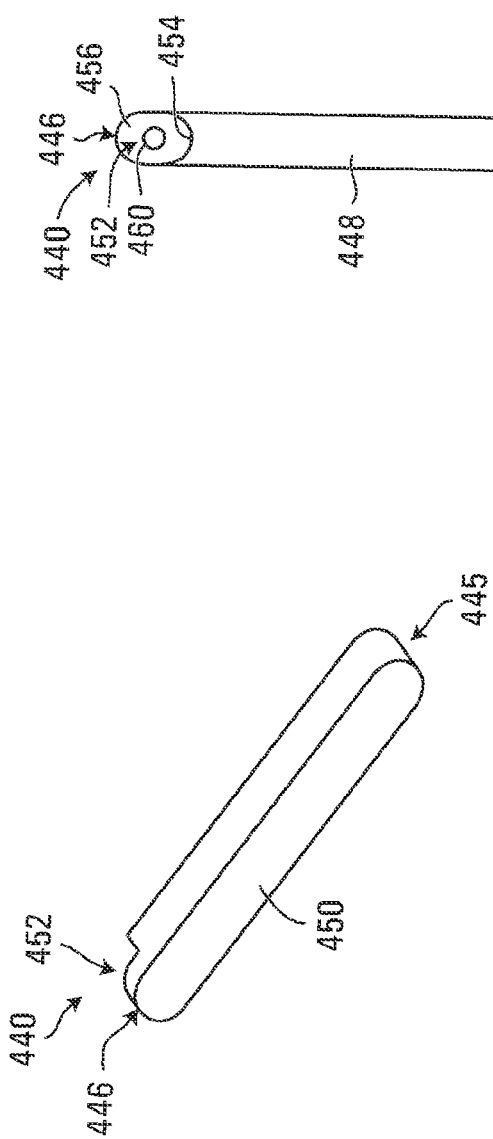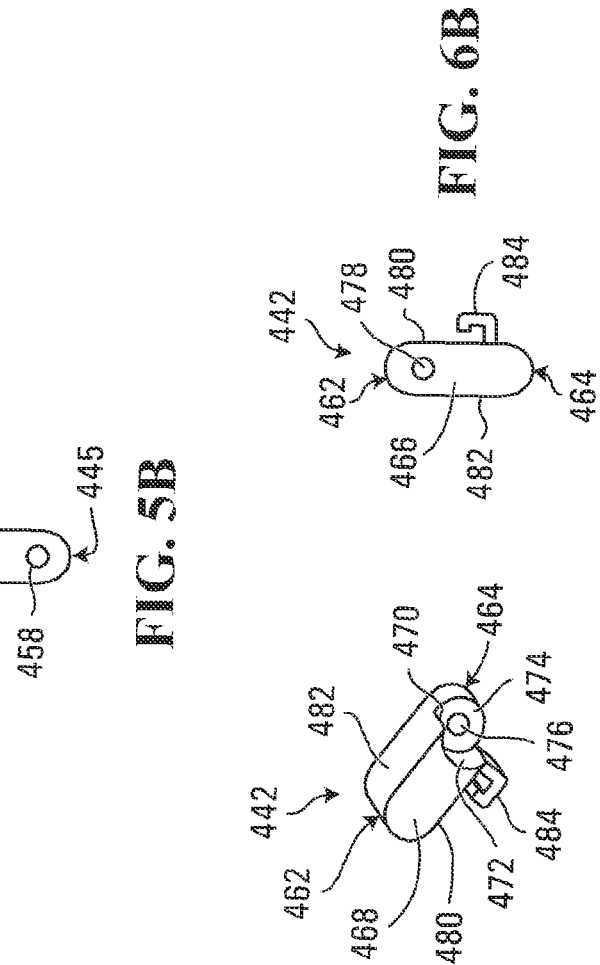

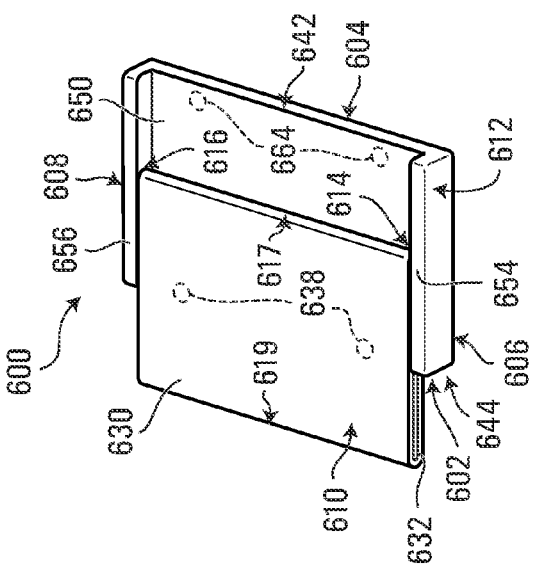
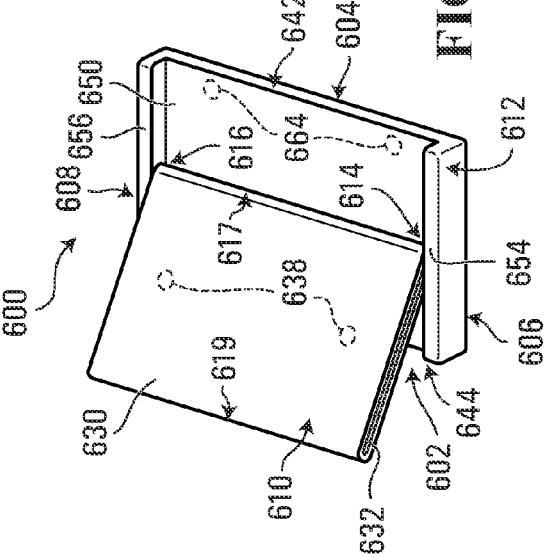
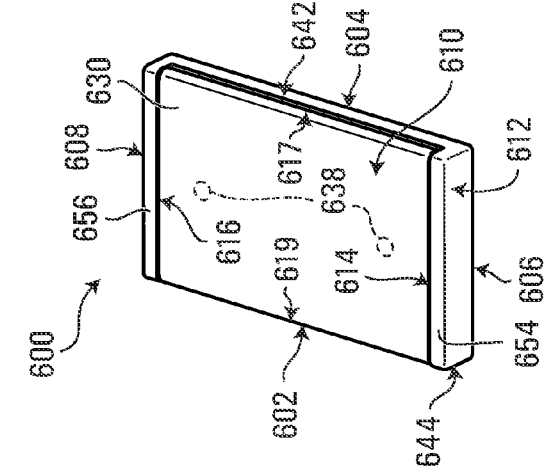

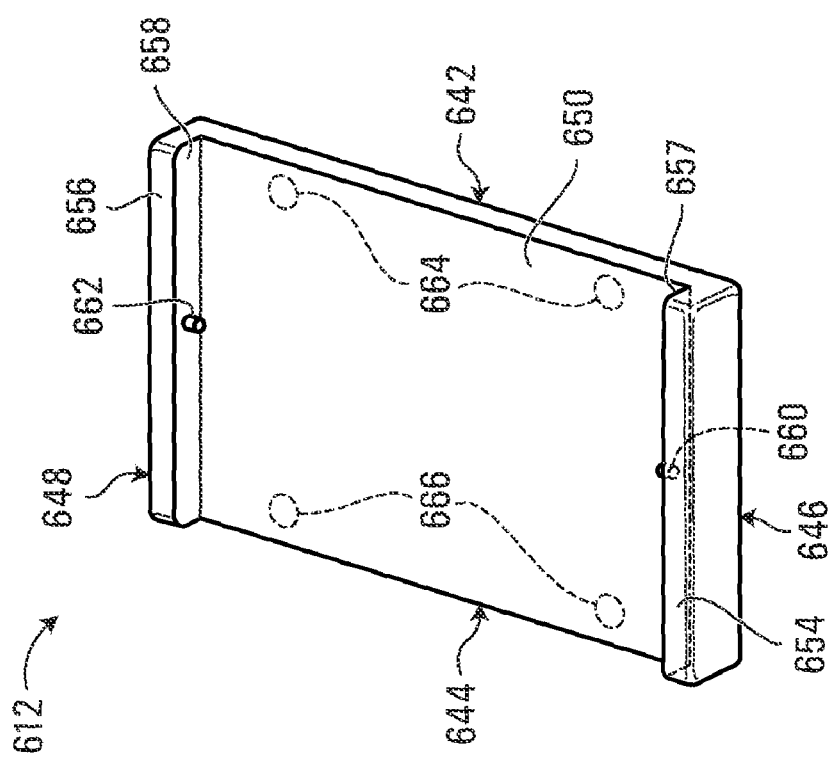

MOBILE COMMUNICATION DEVICE HAVING ROTATABLE MEMBER

FIELD

The application relates to mobile communication devices, and more particularly to mobile communication devices having first and second body members which may be arranged in opened and closed positions.

BACKGROUND

A mobile communication device may include display and/or interface elements such as a touchscreen, a graphical display, and/or a keyboard. A touchscreen or graphical display may be large and essentially cover an entire surface of the device. Mobile communications devices having large interface elements, such as a large touchscreen or graphical display, may typically be limited in their ability to protect those large elements. For example, a conventional mobile communication device with a large touchscreen and/or graphical display may include a single main body member which houses the interface elements of the device. Alternatively, the touchscreen or graphical display may be on a first device member which can slide with respect to a second device member in order to expose further interface elements. This type of device may be referred to as a "slider" device. In either case, the touchscreen and/or graphical display may be constantly exposed. Therefore, interface elements, such as a touchscreen or display, may become scratched, dirty, or otherwise degraded when not in use.

Some mobile communication devices such as "flip phone" or "clamshell" devices may provide opened and closed positions. A flip phone type device, may comprise at least a first body member and a second body member which are coupled together at a linked end by a hinge or linkage mechanism. The first member and the second member may rotate away from each other to open. Conventional flip and slider devices may be larger when opened than when closed. Such an increased size during use may not be desirable to users who prefer a smaller form factor.

BRIEF DESCRIPTION OF THE DRAWINGS

Embodiments will now be described in greater detail with reference to the accompanying diagrams, in which:

FIG. 1C is a perspective view of the mobile communication device of FIG. 1A in an intermediately opened position;

FIG. 1D is a perspective view of the mobile communication device of FIG. 1A in an almost opened position;

FIG. 4C is a perspective view of the mobile communication device of FIG. 4A in an intermediately opened position;

FIG. 4D is a perspective view of the mobile communication device of FIG. 4A in an almost opened position;

FIG. 5A is a perspective view of a long link of the mobile communication device of FIG. 4A;

FIG. 5B is a side view of the long link of FIG. 5A;

FIG. 6A is a perspective view of a short link of the mobile communication device of FIG. 4A;

FIG. 6B is a side view of the short link of FIG. 6A;

FIG. 8A is a perspective view of a mobile communication device according to a third embodiment in a fully closed position;

FIG. 8B is a perspective view of the mobile communication device of FIG. 8A in a horizontally displaced closed position;

FIG. 8C is a perspective view of the mobile communication device of FIG. 8A in an almost closed position;

FIG. 9 is a perspective view of a top member of the mobile communication device of FIG. 8A; and FIG. 10 is a perspective view of a base member of the mobile communication device of FIG. 8A.

DETAILED DESCRIPTION

Figure 1B:
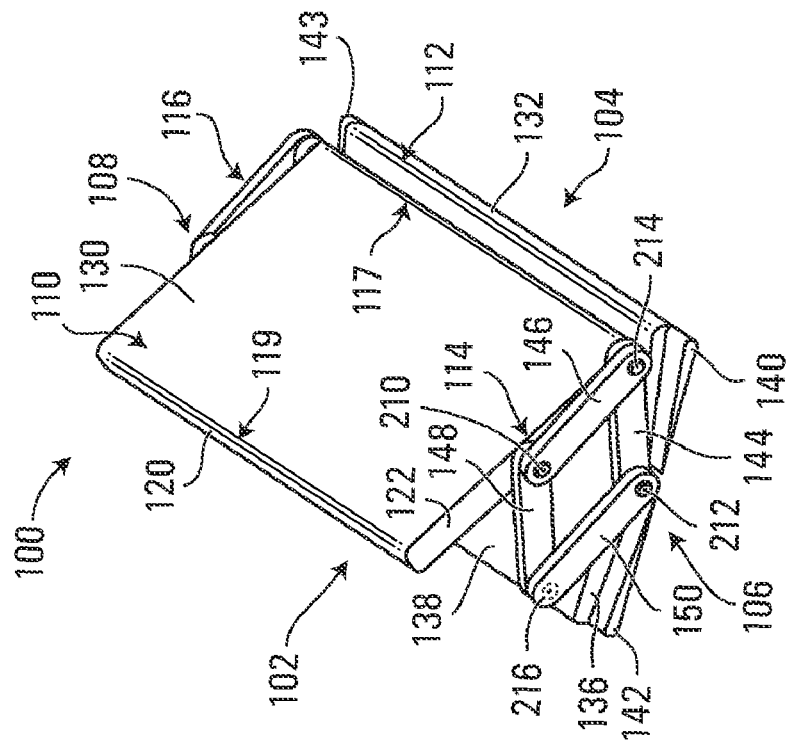
FIG. 1B is a perspective view of the mobile communication device of FIG. 1A in a partially opened position.

According to one embodiment, there is provided a mobile communication device comprising: a first member having a first surface and a second surface opposite to the first surface; a second member; at least one linkage mechanism. The at least one linkage mechanism interconnects the first member and the second member whereby the first member and the second member can be moved relative to each other between a first position and a second position. The device further comprises a biasing mechanism which drives at least a portion of movement of the device between the first position and the second position. The first member overlies the second member in both the first position and the second position. The first surface is inaccessible and the second surface is accessible when the device is in the first position, and the first surface is accessible and the second surface is inaccessible when the device is in the second position.

According to another embodiment, there is provided a mobile communication device comprising: a first member having a first surface and a second surface opposite to the first surface; a second member; and at least one linkage mechanism. The at least one linkage mechanism interconnects the first member and the second member whereby the first member and the second member can be moved relative to each other between a first position and a second position. The first member and the second member are biased or restricted such that there is substantially no separation between the first member and the second member during movement between the first and second positions. The first member overlies the second member in both the first position and the second position. The first surface is inaccessible and the second surface is accessible when the device is in the first position, and the first surface is accessible and the second surface is inaccessible when the device is in the second position.

Other aspects and features of the embodiments will become apparent, to those ordinarily skilled in the art, upon review of the following description of the specific embodiments.

As described above, mobile communication devices housing interface elements such as a large touchscreen and/or a graphical display may typically include a single main body member and may not provide an opened or closed position to protect the interface elements of the device. Furthermore, touchscreens, graphical displays, and/or other interface elements may become scratched and dirty if unprotected. Therefore, it may be desirable to provide a mobile communication device providing a protective closed position. It may also be desirable for the device to be easily and conveniently moved between the closed and opened positions. In addition, it may be desirable to provide a form factor which remains the same size when both opened and closed as such a form factor may be more suitable for a larger touchscreen than conventional flip or slider devices which increase size when opened.

As described herein, first and second body members may be commonly referred to as top and base members respectively. The top member may include a touchscreen, graphical display, a keyboard and/or other interface elements, although some embodiments may include interface elements on the base member. The term "interface elements" as used herein may include one or more interactive user interfaces such as a touch screen, keys, a control surface, etc. No particular one type of element described above is required to constitute interface elements as referred to herein. An interface surface may also include a graphical display. A graphical display could also be provided in combination with other interface elements or alone on an interface surface as described above. It is to be understood that the term "interface elements" includes a sole graphical interface on an interface surface and embodiments are not limited to interface surfaces which accept input from a user.

FIGS. 1A to 1E are perspective views of a device 100 according to a first embodiment in a first or closed position, a partially opened position, a intermediately opened position, an almost opened position, and a second or fully opened position respectively. The device 100 has a first device end 102, an opposite second device end 104, a first device side 106 and an opposite second device side 108. In this embodiment, the device 100 includes a first or top member 110, a second or base member 112, a first linkage or hinge mechanism 114 and a second linkage or hinge mechanism 116.

The distance from the first device end 102 to the second device end 104 may be referred to as the length of the device. The distance from the first device side 106 to the second device side 108 may be referred to as the width of the device.

In this embodiment, the length of the device 100 is approximately equal to the length of each of the top member 110 and the base member 112. The direction extending from the first device end 102 to the second device end 104 is referred to herein as the forward direction and the opposite direction is referred to herein as the backward direction. Therefore, the first device end 102, and the opposite second device end 104 are referred to herein as the back device end 102 and the front device end 104 respectively. The direction extending perpendicularly away from the base member 112 toward the top member 110 is referred to herein as the upward direction and the opposite direction is referred to herein as the downward direction. An orientation in the upward and/or downward direction may be referred to as vertical. These reference directions are for ease of description and do not restrict the orientation of the elements of the device 100 including the top member 110 and the base member 112 during use.

In this embodiment, the top member 110 and the base member 112 are substantially flattened members with rectangular cross-sections. In this embodiment, the top member 110 and the base member 112 are approximately the same size, although embodiments are not so limited. For example, the top member could be thicker, wider, or longer than the base member or vice versa. In this embodiment, the top member 110 includes a first top member end 117 having a first top member end surface 118, an opposite second top member end 119 having a second top member end surface 120 (shown in FIGS. 1B to 1E), a first top member side surface 122 and an opposite second top member side surface (not shown). The top member 110 also includes a first or interface surface 126 (shown in FIGS. 1D and 1E) which, in this embodiment, is substantially flat and includes a touchscreen 128 (shown in FIGS. 1D and 1E). In this embodiment, the top member 110 also includes a second or protective surface 130 (shown in FIGS. 1A to 1C) which is substantially flat and on an opposite face of the top member 110 from the interface surface 126. The protective surface 130 has no interface elements.

It is to be understood that embodiments are not limited to top members having a touchscreen and, in some embodiments, the touchscreen 128 may be omitted. In some embodiments, the interface surface 126 may include a graphical display, a keyboard and/or other interface elements. It is to be understood that some embodiments may include additional graphical displays or interface elements on either the top member 110 or the base member 112, and embodiments are not limited to those having a single touchscreen 128 on the top member 110. It is also to be understood that the term "protective surface" used herein does not imply any special feature of the protective surface 130, although, in some embodiments, the protective surface 130 may be designed to protect the top member from damage or wear when the device is in a closed position. In some embodiments, rather than a blank or protective surface, the face of the top member 110 opposite to the interface surface 126 may also include interface elements. For example, one or more interface elements could be present on one surface/face of a top member, and one or more same or different interface elements could be present on the opposite surface/face of the top member. In such an embodiment, "opening" and "closing" the device would simply allow the user to switch between interface elements the user desired to utilize. While using interface elements on one face of the top member, unused interface elements on the opposite face may be protected.

The base member 112 includes a front base member end surface 132, an opposite back base member end surface 133 (shown in FIG. 3), a first base member side surface 136 and an opposite second base member side surface (not shown). The base member 112 also includes an upper base member surface 138 (shown in FIGS. 1B to 1D) which is substantially flat and a lower base member surface 139 (shown in FIG. 3) opposite to the upper base member surface 138. The base member 112 further includes a first front tapered extension 140 and a first back tapered extension 142, each extending perpendicularly and outwardly from the first base member side surface 136.

The first front tapered extension 140 of the base member 112 is aligned with the lower base member surface 139 (shown in FIG. 3) and the front base member end surface 132. The first front tapered extension 140 tapers from a thickness, which is approximately half of the thickness of the base member 112 at the front base member end surface 132, to an end point almost midway from the front base member end surface 132 to the back base member end surface 133. Similarly, the first back tapered extension 142 of the base member 112 is aligned with the lower base member surface 139 and the back base member end surface 133 (shown in FIG. 3). The first back tapered extension 142 tapers from a thickness, which is approximately half of the thickness of the base member 112 at the back base member end surface 133, to an end point almost midway from the back base member end surface 133 to the front base member end surface 132.

An opposite second front extension 143 and an opposite second back extension (not shown) each extend outwardly from the second base member side surface and mirror the first front tapered extension 140 and the first back tapered extension 142 respectively.

The first front tapered extension 140, the first back tapered extension 142, the second front tapered extension 143 and the second back tapered extension are shaped to allow clearance of the first hinge mechanism 114 and the second hinge mechanism 116.

The first hinge mechanism 114, the top member 110 and the base member 112 are described in more detail with reference to FIG. 2. The assembly of the device 100 is also described with reference to FIG. 2. The movement and interaction of the elements of the device 100 will then be described turning back to FIGS. 1A to 1E and also with reference to FIG. 3.

Figure 1A:
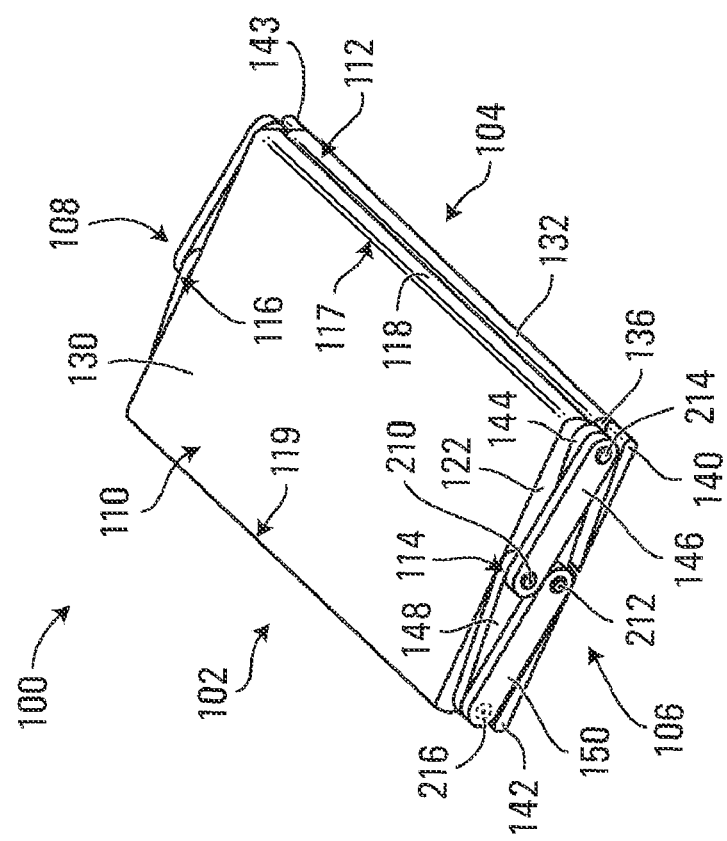
FIG. 1A is a perspective view of a mobile communication device according to a first embodiment in a closed position.
Figure 1E:
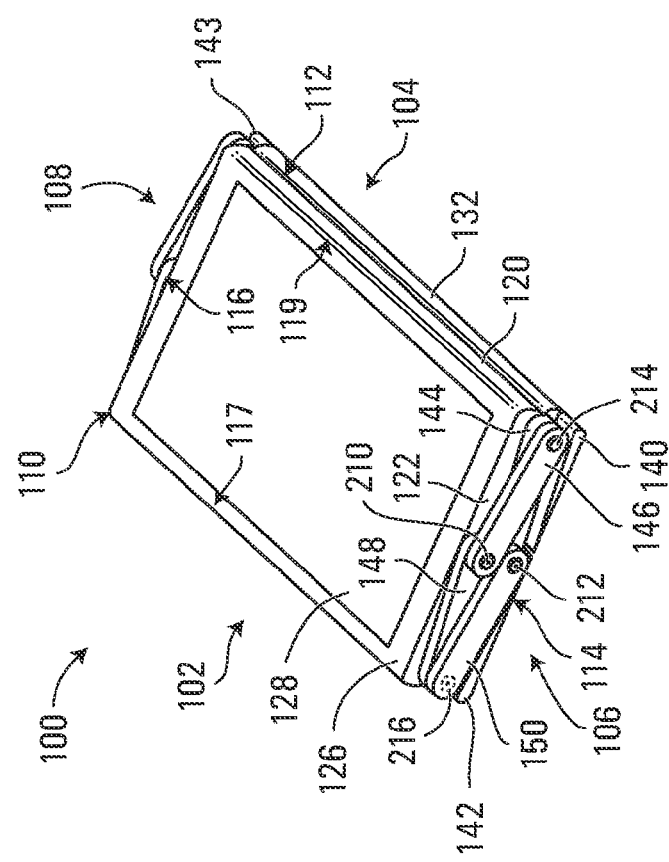
FIG. 1E is a perspective view of the mobile communication device of FIG. 1A in a fully opened position.
Figure 2:
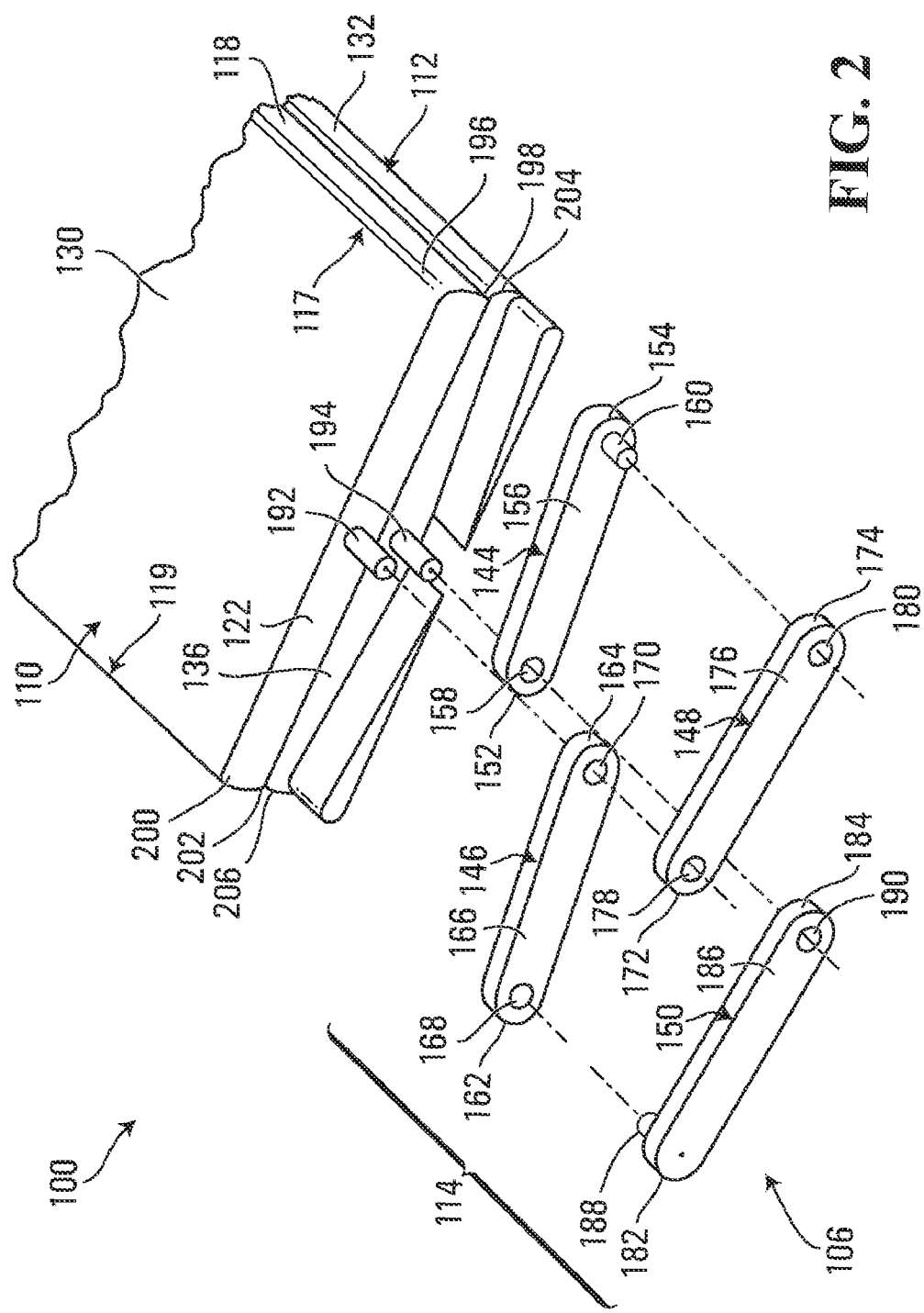
FIG. 2 is a partially exploded perspective view of the mobile communication device of FIG. 1A in the closed position.

FIG. 2 is an enlarged partially exploded perspective view of the device 100 which shows the first hinge mechanism 114 at the first device side 106 in more detail. The second hinge mechanism 116 (shown in FIGS. 1A to 1E) essentially mirrors the first hinge mechanism 114 in form and function, but is disposed opposite to the first hinge mechanism 114 at the second device side 108 (shown in FIGS. 1A to 1E). Therefore, for simplicity and clarity, only the first hinge mechanism 114 is described below, although it is to be understood that the following description of the first hinge mechanism 114 also applies to the mirrored second hinge mechanism 116.

Embodiments are not limited to those having first and second mirrored linkage elements 114/116 (shown in FIGS. 1A to 1E) on respective first and second sides 106/108 (shown in FIGS. 1A to 1E) of the device 100. In some embodiments, a first and second hinge mechanism could be on respective sides of a device, but could also be offset from one another so as not to be mirrored. For example, one hinge mechanism may connect to top and base members in centered positions on the members' sides, while another hinge mechanism could connect at positions on the members' sides near one of the device ends. In some embodiments, only one hinge mechanism on one side of a device may be utilized. For example, a simple support could be present in place of the second hinge mechanism 116. Alternatively, the top member 110 and the bottom member 112 may be unconnected on either the first device side 106 or the second device side 108 in some embodiments.

In this embodiment, the first hinge mechanism 114 is expandable and includes a first link 144, a second link 146, a third link 148, and a fourth link 150. Each of the first link 144, the second link 146, the third link 148, and the fourth link 150 are elongated and have an approximately equal length. In this embodiment, the length of the first link 144, the second link 146, the third link 148, and the fourth link 150 is approximately half the length of the first device side 106, although embodiments are not so limited. For example, in some embodiments, the combined length of the first link 144 and the third link 148, and the combined length of the second link 146 and the fourth link 150 may be slightly more than half the length of the first top member 110 (i.e. half the length of the first top member side surface 122). Such a combined length may allow the first hinge mechanism 114 to expand sufficiently to allow the top member 110 to rotate between the closed and opened position, as will be described more below.

The first link 144 includes a first link back end 152, an opposite first link front end 154, a first link outer surface 156 and an opposite first link inner surface (not shown). A first link pivot hole 158 is disposed near the first link back end 152 and a first link pivot pin 160 projects perpendicularly away from the first link outer surface 156 near the first link front end 154.

The second link 146 includes a second link back end 162, an opposite second link front end 164, a second link outer surface 166 and an opposite second link inner surface (not shown). A second link back pivot hole 168 is disposed near the second link back end 162 and a second link front pivot hole 170 is disposed near the second link front end 164.

The third link 148 includes a third link back end 172, an opposite third link front end 174, a third link outer surface 176 and an opposite third link inner surface (not shown). A third link back pivot hole 178 is disposed near the third link back end 172 and a third link front pivot hole 180 is disposed near the third link front end 174.

The fourth link 150 includes a fourth link back end 182, an opposite fourth link front end 184, a fourth link outer surface 186 and an opposite fourth link inner surface (not shown). A fourth link pivot pin 188 projects perpendicularly away from the fourth link inner surface near the fourth link back end 182 and a fourth link pivot hole 190 is disposed near the fourth link front end 184.

As can be seen in FIG. 2, in this embodiment, the top member 110 includes a top member pivot pin 192 which projects perpendicularly away from the approximate center of the first top member side surface 122. The base member 112 includes a base member pivot pin 194 which projects perpendicularly away from the approximate center of the first base member side surface 136.

Some embodiments may include at least one partially curved surface to facilitate initial movement of the device 100 from the closed or fully opened positions although embodiments are not so limited. In this embodiment, the top member 110 has rounded corner edges at the first top member end 117 and the second top member end 119. Specifically, the intersections between each of the protective surface 130 and the interface surface 126 (shown in FIGS. 1D and 1E) of the top member 110 with the first top member end surface 118 form a first top member rounded corner 196 and a second top member rounded corner 198 respectively at the first top member end 117. The intersections between each of the protective surface 130 and the interface surface 126 of the top member 110 with the second top member end surface 120 (shown in FIGS. 1B to 1E) form a third top member rounded corner 200 and a fourth top member rounded corner 202 respectively at the second top member end 119. The corners of the top member 110 may be more or less rounded than shown in the figures. In some embodiments, the entirety of the surfaces corresponding to the interface surface 126 and the protective surface 130 of the top member 110 could be curved.

Figure 3:
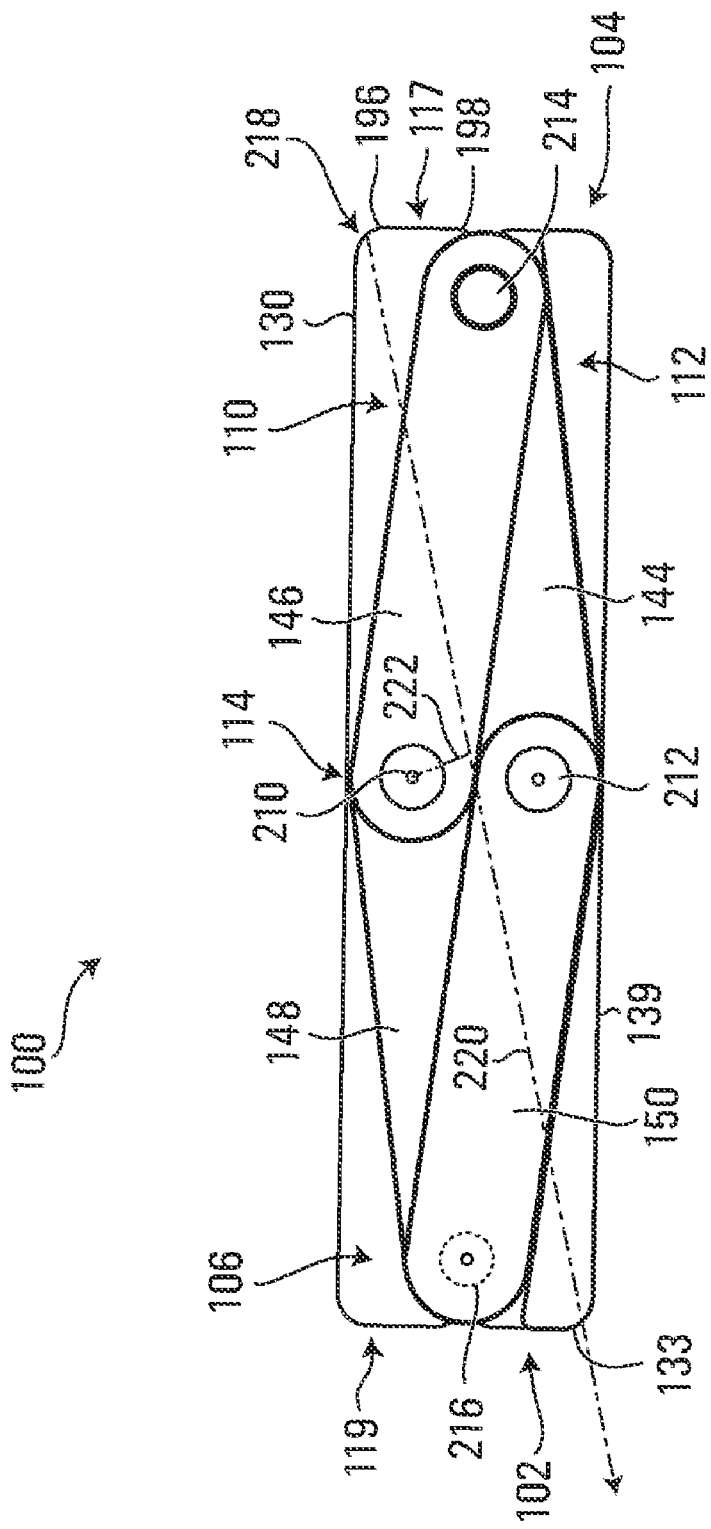
FIG. 3 is a side view of the mobile communication device of FIG. 1A in the closed position.

In this embodiment, the base member 112 similarly includes rounded corners including a first base member rounded corner 204 and a second base member rounded corner 206 at respective intersections of the upper base member surface 138 (shown in FIGS. 1B to 1D) with each of the front base member end surface 132 and the opposite back base member end surface 133 (shown in FIG. 3). However, in some embodiments, the base member 112 may not include rounded corner edges.

The top member pivot pin 192, the third link back pivot hole 178 and the second link front pivot hole 170 have cooperating shapes to form a rotatable pin jointer connection or pivot hinge. The base member pivot pin 194, the first link pivot hole 158 and the fourth link pivot hole 190 have cooperating shapes to form a rotatable pin jointer connection or pivot hinge. The first link pivot pin 160 and the third link front pivot hole 180 have cooperating shapes to form a rotatable pin jointer connection or pivot hinge. The fourth link pivot pin 188 and the second link back pivot hole 168 have cooperating shapes to form a rotatable pin jointer connection or pivot hinge.

As assembled, the top member pivot pin 192 is received in the second link front pivot hole 170 and the third link front pivot hole 178 to form a first rotatable pin jointer connection hereinafter referred to as a top pivot 210 (shown in FIGS. 1A to 1E). The second link 146 is located inward from the third link 148. The top pivot 210 rotatably couples the second link 146 and the third link 148 to the top member 110.

The base member pivot pin 194 is received in the first link pivot hole 158 and the fourth link pivot hole 190 to form a second rotatable pin jointer connection hereinafter referred to as a base pivot 212 (shown in FIGS. 1A to 1E) with the first link 144 located inward from the fourth link 150. The base pivot 212 rotatably couples the first link 144 and the fourth link 150 to the base member 112.

The first link pivot pin 160 is received in the third link front pivot hole 180 to form a rotatable pin jointer connection hereinafter referred to as a front pivot 214 (shown in FIGS. 1A to 1E) with the first link 144 disposed inward from the third link 148. The front pivot 214 rotatably couples the first link 144 and the third link 148.

The fourth link pivot pin 188 is received in the second link back pivot hole 168 to form a rotatable pin jointer connection hereinafter referred to as a back pivot 216 (shown in FIGS. 1A to 1E using a dotted line as the pivot is hidden by the fourth link 150) with the second link 146 disposed inward from the fourth link 150. The back pivot 216 rotatably couples the second link 146 to the fourth link 150.

Thus, the first hinge mechanism 114 interconnects the top member 110 and the base member 112. Specifically, the hinge mechanism 114 is pivotably connected to the top member 110 at a single point, the top pivot 210, and to the base member 112 at a single point, the base pivot 212. The first link 144 and the third link 148 form a first set of links connected in series between the top member 110 and the second member 112. The second link 146 and the fourth link 150 form a second set of links connected in series between the top member 110 and the second member 112. In this embodiment, the third link 148 and the fourth link 150 share a vertical plane parallel to the first device side 106. The first link 144 and the second link 146 share an adjacent vertical plane also parallel to the first device side 106.

Embodiments are not limited to those having a first hinge mechanism 114 including the particular first link 144, the third link 148, the second link 146 and the fourth link 150 described above. For example, the first link 144, the third link 148, the second link 146 and the fourth link 150 may be shorter or longer or have other dimensional variances chosen for particular implementations.

Some embodiments may comprise a biasing mechanism which may be used to drive a portion of movement of a device from a closed to an opened position. A biasing mechanism may also bias the top member to remain in contact with the base member during the movement between opened and closed positions. Numerous biasing mechanisms, such as mechanical or magnetic biasing mechanisms could be implemented in various embodiments.

In this embodiment, the device 100 may comprise a mechanical biasing mechanism, such as a spring, to bias the top member 110 toward the base member 112, thereby biasing the device 100 to remain in either the closed position or the opened position. As will be explained in more detail below, biasing the top member 110 toward the base member 112 may partially drive movement of the device between closed and opened positions and/or may bias a top member to remain in contact with a base member as the device is opened or closed. In this embodiment, the first hinge mechanism 114 may be spring loaded to bias the first hinge mechanism 114 to remain folded as in the closed position shown in FIG. 1A or the fully opened position shown in FIG. 1E. Alternatively, an extension spring may be connected between the top member 110 and the base member 112 near the top pivot 210 and the base pivot 212. The same bias force can serve the function of keeping the device 100 opened or closed because the first hinge mechanism 114 is in the same position when the device 100 is both closed and fully opened. It will be apparent to one skilled in the art that various means to provide a bias force to bias the top member 110 toward the base member 112 could be used.

The interaction of the elements of the device 100 will now be described with reference to FIGS. 3 and 1A to 1E.

FIG. 3 is a side view of the device 100 in the closed position showing the first device side 106 and the first hinge mechanism 114 including the first link 144, the second link 146, the third link 148, and the fourth link 150. Opening and closing the device 100 includes a similar movement of the top member 110. In addition, either opening or closing the device 100 may be accomplished with a similar or the same force applied by a user of the device 100.

Starting from the closed position shown in FIG. 3 the interface surface 126 (shown in FIGS. 1D and 1E) of the top member 110 is adjacent to the upper base member surface 138 (shown in FIGS. 1B to 1D). Therefore, the protective surface 130 is exposed, and the interface surface 126 is not accessible and may be protected from being scratched or otherwise damaged. The first top member end 117 is aligned with the front device end 104 and the second top member end 119 is aligned with the back device end 102. The first hinge mechanism 114 is vertically folded such that the top pivot 210 and the base pivot 212 are close to each other. The front pivot 214 and the back pivot 216 are spaced apart near the respective front device end 104 and back device end 102.

From the closed position, the top member 110 may be moved relative to the base member 112 to the fully opened position (shown in FIG. 1E) by moving through the positions shown in FIGS. 1A to 1E in which the top member 110 is rotated approximately 180 degrees in the clockwise direction. Alternatively, though not shown, the top member 110 may be moved in the opposite direction to be moved to the opened position.

In order to initiate movement of the device 100 from the closed position (shown in FIG. 1A) to the partially opened position (shown in FIG. 1B), a user of the device 100 may simply apply force to the first top member end 117 in a backward and downward direction, indicated by the arrow 218. The force may be applied, for example, near the first top member rounded corner 196. The force applied to the top member 110 therefore has a backward component and a downward component. The applied force 220 is represented by a dot-dash arrow. The force also includes a "moment arm"

to the top pivot 210 represented by the dotted line 222. The "moment arm" 222 is the perpendicular distance of the applied force 220 from the top pivot 210. The moment arm 222 represents the equivalent portion of the applied force 220 which is applied as pure rotation force about the top pivot 210. Since some moment arm 222 exists, that means that some of the applied force 220 is acting on rotating the top pivot 210, and therefore the top member 110 will begin to rotate.

As mentioned above, springs or another biasing mechanism may also bias the top member 110 toward the second member 112. Thus, the top member 110 may be biased to remain in continuous contact with the base member 112 during the movement between the closed and fully opened positions. For example, as seen in FIG. 1B, the first top member end 117 may naturally remain in contact with the base member 112 as the top member 110 begins to rotate in the clockwise direction.

The moment arm 220 drives initial rotation (clockwise in FIGS. 1A to 1E) of the top member 110 about the top pivot 210. The initial rotation is also facilitated by the second top member rounded corner 198. The curve of the second top member rounded corner 198 allows the top member to roll against the upper base member surface 138 as the top member 110 begins to rotate, thereby reducing the required force to initially drive movement of the device 100 from the closed position. By reducing the required applied force 220 to initially move the top member 110, the friction between the top member 110 and the base member 112 will also be reduced. Therefore, the device 110 may be more easily opened than a device with no curved surfaces on the top member 110.

As the top member 110 rotates about the top pivot 210, the device 100 moves from the closed position shown in FIG. 3 to the partially opened position shown in FIG. 1B. Turning to FIG. 1B, as the first top member end 117 slides backward along the upper base member surface 138 (shown in FIGS. 1B to 1D) the top pivot 210 and the top member 110 are initially forced in the upward direction (as shown in FIG. 1B). The upward movement of the top pivot 210 is allowed by upward expansion of the first hinge mechanism 114. Specifically, the first link 144, the third link 148, the second link 146 and the fourth link 150 are free to rotate such that the front pivot 214 and the back pivot 216 move closer to each other while the top pivot 210 moves upward away from the base pivot 212. Thus, the first hinge mechanism 114 moves from the vertically folded position towards an expanded position.

Once the top pivot 210 has moved a slight distance upward, the user of the device 100 may simply apply continued force in the backward direction approximately parallel to the upper base member surface 138. For example, the force may be applied near the first top member end surface 118 or the protective surface 130 near the first top member rounded corner 196 (shown in FIGS. 2 and 3).

In some embodiments, in order to further facilitate the initial movement of the device 100 by reducing the friction between the top member 110 and the base member 112, and/or by reducing the force required to initiate movement of the top member 110, the first top member rounded corner 196, the second top member rounded corner 198, the third top member rounded corner 200 and the fourth top member rounded corner 202 (each shown in FIGS. 2 and 3) may define a larger and more gradual curve. Increasing the rounding of edges can more easily convert the initial force applied to the top member 110 to a rotation of the top member by increasing the leverage on the top member 110. Alternatively, providing a concave portion (not shown) of the base member 112 near the front device end 104 may perform a similar function. Such a groove could be near the front device end 104. Embodiments are not limited to the shape of the top member 110 and the base member 112 of the device 100 shown in FIGS. 1A to 3. For example, in some embodiments, as noted above, the entirety of the surfaces corresponding to the interface surface 126 (shown in FIGS. 1D and 1E) and the protective surface 130 of the top member 110 could be curved. However, it is to be understood that some embodiments may not include curved surfaces on either a top member or a base member, or other similar features, to facilitate initial movement between the opened and closed positions. Some embodiments may include substantially flat surfaces which form sharp corners between the surfaces.

As the continued force is applied by the user, the device 100 continues to move from the partially opened position shown in FIG. 1B through the intermediately opened position shown in FIG. 1C. Specifically, the top member 110 continues to rotate in the clockwise direction and first hinge mechanism 114 continues to expand to a vertically expanded position to allow the top pivot 210 to move in the upward direction. When the top member 110 has rotated such that it is aligned approximately perpendicularly with respect to the base member 112 (as shown in FIG. 1C), the top pivot 210 is maximally displaced from the base member 112. The length of the first link 144, the third link 148, the second link 146, and the fourth link 150 is sufficient to allow the first hinge mechanism 114 to expand sufficiently for the top to continue to rotate through the intermediately opened position shown in FIG. 1C. Specifically, the top pivot 210 may expand at least half the length of the first top member side surface 122.

With continued force applied to the top member 110, the top member 110 will rotate past the intermediately opened position shown in FIG. 1C to the almost opened position shown in FIG. 1D. Once the top member 110 passes the intermediately opened position, the first hinge mechanism 114 may begin to contract again. Specifically, the top pivot 210 may again move downward toward the base pivot 212 and the front pivot 214 and the back pivot 216 may again move apart.

At this point, the biasing mechanism which provides a force to contract the hinge may provide sufficient biasing force to the top member 110 to complete the movement to the fully opened position shown in FIG. 1E. Specifically, contracting the first hinge mechanism 114 forces the top member 110 and the top pivot 210 to move closer to the base member 112. As the top member 110 moves closer to the base member 112, the top member 110 continues to rotate until the top member 110 and the base member 112 are again parallel and adjacent. Thus, by biasing the top member 110 toward the base member 112, a biasing mechanism may drive a portion of the movement of the top member 110 between opened and closed positions. In embodiments where the bias force is not present or not sufficient, the user can apply force to continue the rotation of the top member 110 to the fully opened position.

As shown in FIG. 1E, in the fully opened position, the top member 110 again rests against the base member 112. However, in the opened position, the interface surface 126, and, therefore, the touchscreen 128, are accessible. The protective surface 130 (shown in FIGS. 1A to 1C) is adjacent to the base member 112. The top member 110 has effectively been rotated 180 degrees in the clockwise direction in the movement from the closed position (shown in FIG. 1A) to the fully opened position. The second top member end 119 is aligned with the front device end 104 and the first top member end 117 is aligned with the back device end 102. The first hinge mechanism 114 and the second hinge mechanism 116 are in the same position as in the closed position of the device 100 (shown in FIG. 1A).

The top member 110 can be again rotated 180 degrees in the same clockwise direction or in the counter-clockwise direction to move the device 100 from the fully opened position back to the closed position. When the device 100 is moved from the fully opened position to the closed position, the first hinge mechanism 114 will move in approximately the same manner as described with reference to opening the device. The user could, for example, apply a similar force to the top member 110 as described above, except the force will be applied at the second top member end 119 in order to close the device. Similar rotation of the top member 110 and similar expansion/contraction of the first hinge mechanism 114 will occur. Therefore, the device 100 can be moved from the closed position to the opened position, and from the opened position to the closed position by using the same movement of the user. The top member 110 is free to rotate 360 degrees about the top pivot 210 of the top member 110 where the 360 degree movement consists of two half rotations using movements as described above. Also, as mentioned above, the top member 110 can be moved to rotate in either the clockwise or counter-clockwise direction. Therefore, the top member 110 can essentially rotate continuously in either the clockwise, or counter clockwise direction.

The touchscreen 128 may be accessible in other positions between the closed and the fully opened positions. For example, a user may wish to use the touchscreen 128 when the interface surface 126 is at a variety of angles greater than 90 degrees with respect to the upper base member surface 138 (shown in FIGS. 1B to 1D). Therefore, in some embodiments, the device 100 may include means to lock the top member 110 in one or more positions in addition to the closed position and the fully opened position. Alternatively, if no biasing means is present in the device 100 to keep the device 100 either closed or fully opened, a user can simply partially open the device 100 and still access the touchscreen 128.

The device 100 as described above may allow a user to open the device 100 using a single continuous movement to apply force. For example, it may be possible for a user to apply the necessary opening or closing force to the top member 110 by pushing on the top member 110 with one or more thumbs in a continuous motion. Force in the generally forward and downward direction may be applied to the top member 110, and at the beginning of the motion, and that force could be continuously applied by redirecting to a generally forward force only as the device 100 is moved from the closed or fully opened positions. The same simple continuous motion, applied with the users thumb or thumbs, for example, could be used to both open and close the device. This simple means for opening and closing the device 100 may make the device 100 convenient to use, while allowing protection of the touchscreen 128 while it is not needed.

It may also be possible, if desired, for a user to open and close the device 100 by applying force to lift the top member 110, thereby extending the first hinge mechanism 114 and the second hinge mechanism 116 to allow rotation of the top member 110. If no biasing force to return the top member 110 to a position close to or next to the base member 112 exists in an embodiment, the user could also apply force to lower the top member 110 back adjacent to the base member 112.

A user may be able to hold, and move the device 100 between opened and closed positions using a single one hand. For example, the user could use their palm and fingers of a single hand to hold the device and then use their thumb to apply the necessary force to the top member 110 to open or close the device. Of course, a user is not restricted to single hand use of the device 100.

As mentioned above, the first hinge mechanism 114 may bias the top member 110 toward the base member 112, thereby biasing the device 100 to drive a portion of the rotation between closed and opened positions. This may simplify the process of opening the device for a user, as the user may only need to drive a portion of the rotation, and allow the biasing mechanism to drive the rest.

In addition, biasing the top member 110 toward the base member 112 may bias the top member 110 to remain in contact with the base member 112 during movement between the closed position and the fully opened position. Thus, there may be substantially no separation between the top member 110 and the base member 112 during movement between the closed and fully opened positions. Such biased contact between the top member 110 and the base member 112 may help control the motion of the top member and ensure that the top member 110 rotates properly and smoothly as the user applies force to the top member. For example, by biasing the top member 110 to maintain contact, the top member may be prevented from extending away from the base member 112 and rotating too quickly thereby causing a user to lose control of the initial motion of the top member 110.

As can be seen in FIGS. 1A and 1E, the device 100 is the same approximate size in both the closed and fully opened positions. The top member may house a large interface element, such as touchscreen 128, which covers approximately an entire face of the device in the fully opened position, and which is completely hidden in the closed position. This may provide a desirable interface-element-size-to-device-size-ratio.

Electrical connections between the top member 110 and the base member 112 could be made via a two point contact connection through the first hinge mechanism 114 and the second hinge mechanism 116 at the respective contact points of the top member 110 and the base member 112. In addition, wireless communication could be established between the top member 110 and the base member 112. It is also possible that inductive charging, such as wireless inductive charging, could be established for the device 100. For example, the rotation of the top member 110 could actuate the inductive charger. In some embodiments, charging may not have to be actuated by rotating the top member. In some embodiments, the top member 110 may be charged when the device is closed. In some embodiments, the top member 110 may contain only the necessary electronics to operate the display and interface elements, and the base member 112 may contain the bulk of electronics for the device 100 as well as a battery.

As mentioned above, the device 100 is only described as an example of an embodiment and other top member, base member, and hinge mechanism designs may be implemented. Some embodiments may employ other types of hinge mechanisms that similarly may allow 360 degrees of rotation about a pivot point. The first hinge mechanism 114 described herein is only an example of a possible embodiment. One skilled in the art will appreciate that elements may be omitted or added without departing from aspects of the disclosure. For example, more or less links could be employed. Hinge mechanisms could be rotatably connected to a base member at a different location on the base member.

A second embodiment, in which a hinge mechanism comprises two bar linkages rotatably connected in series, will now be described with reference to FIGS. 4A to 7.

FIGS. 4A to 4E are perspective views of a device 400 according to a first embodiment in a first or closed position, a partially opened position, an intermediately opened position, an almost opened position, and a second or fully opened position respectively. The device 400 has a first device end 402, an opposite second device end 404, a first device side 406 and a second device side 408. In this embodiment, the device 400 includes a first or top member 410, a second or base member 412, a first linkage or hinge mechanism 414 and a second linkage or hinge mechanism 416.

The distance from the first device end 402 to the second device end 404 may be referred to as the length of the device. In this embodiment, the length of the device is approximately equal to the length of each of the top member 410 and the base member 412. The direction extending from the first device end 402 to the second device end 404 is referred to herein as the forward direction and the opposite direction is referred to herein as the backward direction. Therefore, the first device end 402, and the opposite second device end 404 are referred to herein as the back device end 402 and the front device end 404 respectively. The direction extending perpendicularly away from the base member 412 toward the top member 410 is referred to herein as the upward direction and the opposite direction is referred to herein as the downward direction. An orientation in the upward and/or downward direction may be referred to as vertical. These reference directions are for ease of description and do not require any particular orientation of the elements of the device 400 including the top member 410 and the base member 412.

In this embodiment, the top member 410 is generally shaped as a flattened member with an elliptical cross-section. The top member 410 includes a first top member end 417, an opposite second top member end 419, a first top member side surface 422 and an opposite second top member side surface (not shown). The first top member end 417 and the second top member end 419 are rounded, while the first top member side surface 422 and the opposite second top member side surface (not shown) are elliptical. The top member 410 also includes a first or interface surface 426 (shown in FIGS. 4D and 4E) which, in this embodiment, is convexly shaped and includes a touchscreen 428 (shown in FIGS. 4D and 4E). The top member 410 includes a similarly shaped second or protective surface 430 (shown in FIGS. 4A to 4C) on an opposite face of the top member 410 from the interface surface 426. It is to be understood that embodiments are not limited to top members having a touchscreen and, in some embodiments, the touchscreen 428 may be omitted. In some embodiments, the interface surface 426 may include a graphical display, a keyboard and/or other interface elements.

As mentioned above, it is to be understood that embodiments are not limited to top members having a touchscreen and, in some embodiments, the touchscreen 128 may be omitted. Additional interface elements may also be present on at least one of the top member 410 and the base member 412.

In this embodiment, the base member 412 is shaped as a flattened member with a generally U-shaped cross-section. The base member 412 includes a front base member end 432, an opposite back base member end 434 (shown in FIGS. 4B to 4D), a first base member side surface 436 and an opposite second base member side surface (not shown). The front base member end 432 and the back base member end 434 are rounded, while the first base member side surface 436 and the opposite second top member side surface are slightly U-shaped. The base member 412 also includes a concave upper base member surface 438 (shown in FIGS. 4B to 4D) and a convex base member bottom surface opposite to the upper base member surface 438. The upper base member surface 438 is shaped complimentary to both the top member interface surface 426 and the protective surface 430.

In this embodiment, the first hinge mechanism 414 is a type of two-bar linkage. Specifically, the first hinge mechanism 414 includes a first or long link 440 and a second or short link 442 which is shorter than the long link 440. The combined length of links 440 and 442 may be sufficiently long that when fully extended provide enough room for the rotation of the top member to fully rotate above the base member.

The device 400 further includes a first extension spring 443 on the first device side 406 to act as a mechanical biasing mechanism to provide a bias force to bias the top member 410 toward the base member 412. In some embodiments, the device 400 may further include a corresponding second extension spring (not shown) on the second device side 408. The base member 412 further includes a first base spring connecting means 444 on the rear half of the first base member side surface 436 and a corresponding opposite second base spring connecting means (not shown) on the second base member side surface. The first base spring connecting means 444 and the second base spring connecting means may be pins or any other suitable means of connecting an end of a spring to the base member 412. Other biasing mechanisms could be used in other embodiments.

The first hinge mechanism 414 is expandable and will now be described in more detail with reference to FIGS. 5A to 7. The assembly of the device 400 is then described with reference to FIG. 7. The movement and interaction of the elements of the device 400 will then be described turning back to FIGS. 4A to 4E.

The second hinge mechanism 416 essentially mirrors the first hinge mechanism 414 in form and function, but is disposed opposite to the first hinge mechanism 414 at the second device side 408. Therefore, for simplicity and clarity, only the first hinge mechanism 414 is described below, although it is to be understood that the following description of the first hinge mechanism 414 also applies to the mirrored second hinge mechanism 416. Again, embodiments are not limited to those having first and second mirrored linkage elements 414/416 on either side of the device 400.

FIGS. 5A and 5B are a perspective view and a side view of the long link 440 respectively. In this embodiment, the long link 440 is elongated and has a first long link end 445 and a second long link end 446. The long link 440 has a length approximately half of the length of the top member 410. Both the first long link end 445 and the second long link end 446 are rounded. The long link 440 also has an inner long link surface 448 (shown in FIG. 5B) and an outer long link surface 450 (shown in FIG. 5A). A long link pivot clearance recess 452 is disposed at the second long link end 446 and extends inward from the inner long link surface 448.

The long link pivot clearance recess 452 is bounded by a long link pivot clearance surface 454 (shown in FIG. 5B) which is perpendicular to the inner long link surface 448, and by a long link recessed surface 456 (shown in FIG. 5B) which is parallel to the inner long link surface 448. The long link pivot clearance surface 454 is convexly curved. The long link recessed surface 456 is flat and is recessed about midway between the inner long link surface 448 and the outer long link surface 450.

A first long link pivot hole 458 (shown in FIG. 5B) is disposed near the first long link end 445 and extends inward from the inner long link surface 448. A second long link pivot hole 460 (shown in FIG. 5B) is disposed near the second long link end 446 and extends inward from the long link recessed surface 456.

FIGS. 6A and 6B are a perspective view and a side view of the short link 442 respectively. In this embodiment, the short link 442 is elongated and has a first short link end 462 and a second short link end 464. In this embodiment, the short link 442 has a significantly shorter length than the long link 440. Both the first short link end 462 and the second short link end 464 are rounded. The short link 442 also has an inner short link surface 466 (shown in FIG. 6B) and an outer short link surface 468 (shown in FIG. 6A). A short link pivot clearance recess 470 (shown in FIG. 6A) is disposed at the second short link end 464 and extends inward from the outer short link surface 468.

The short link pivot clearance recess 470 is bounded by a short link pivot clearance surface 472 (shown in FIG. 6A) which is perpendicular to the outer short link surface 468, and by a short link recessed surface 474 (shown in FIG. 6A) which is parallel to the outer short link surface 468. The short link pivot clearance surface 472 is convexly curved and is shaped to provide clearance for the second long link end 446. Similarly, the long link clearance surface 454 is shaped to provide clearance for the second short link end 464. The short link recessed surface 474 is flat and is recessed about midway between the inner short link surface 466 and the outer short link surface 468.

A first short link pivot hole 476 (shown in FIG. 6A) is disposed near the second short link end 464 and extends inward from the short link recessed surface 474. A second short link pivot hole 478 (shown in FIG. 5B) is disposed near the first short link end 462 and extends inward from the inner short link surface 466. The short link has a first short link side 480 and an opposite second short link side 482. A spring hook 484 projects perpendicularly away from the first short link side 480.

Figures 4A, 4B:
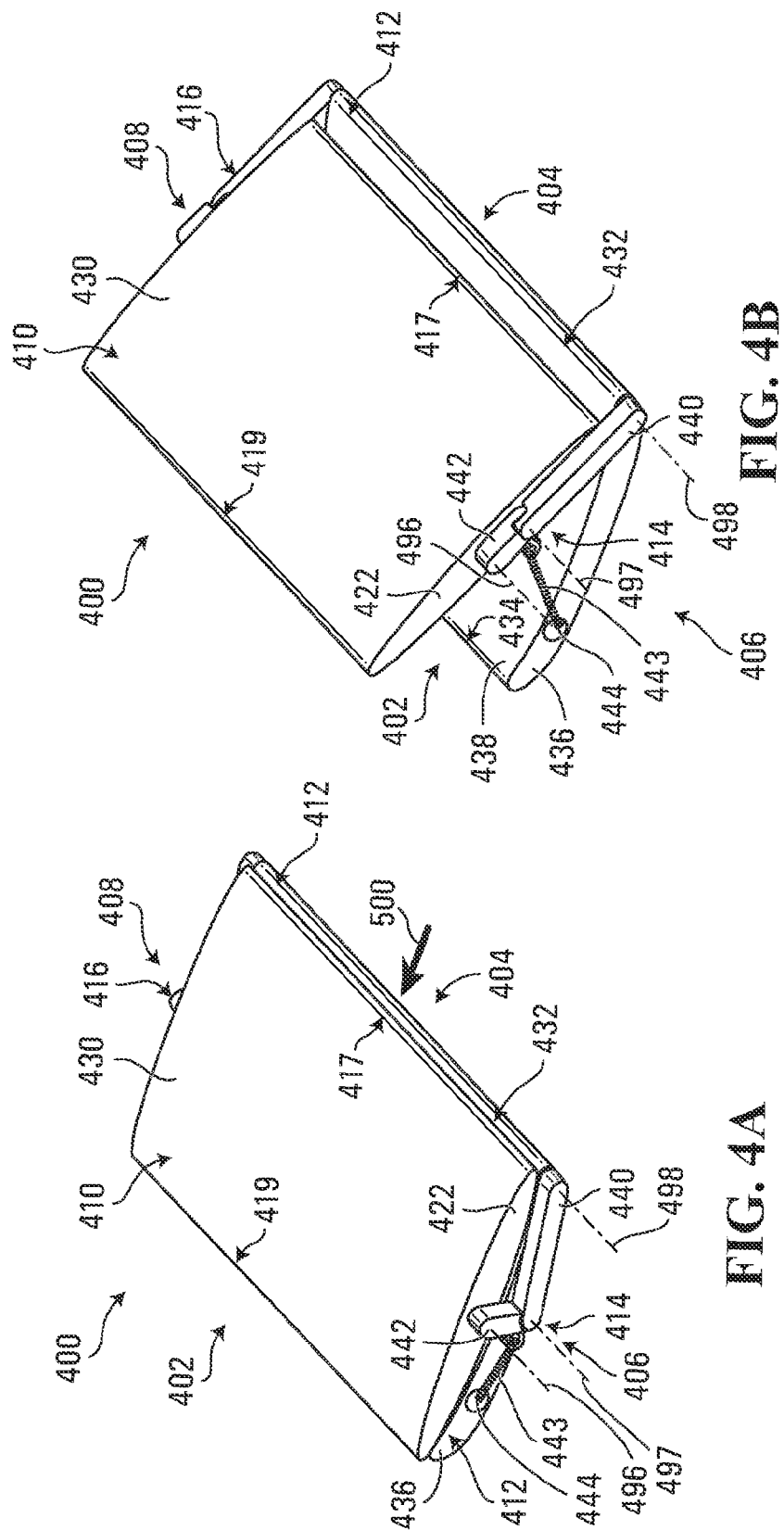
FIG. 4A is a perspective view of a mobile communication device according to a second embodiment in a closed position.
FIG. 4B is a perspective view of the mobile communication device of FIG. 4A in a partially opened position.
Figure 4E:
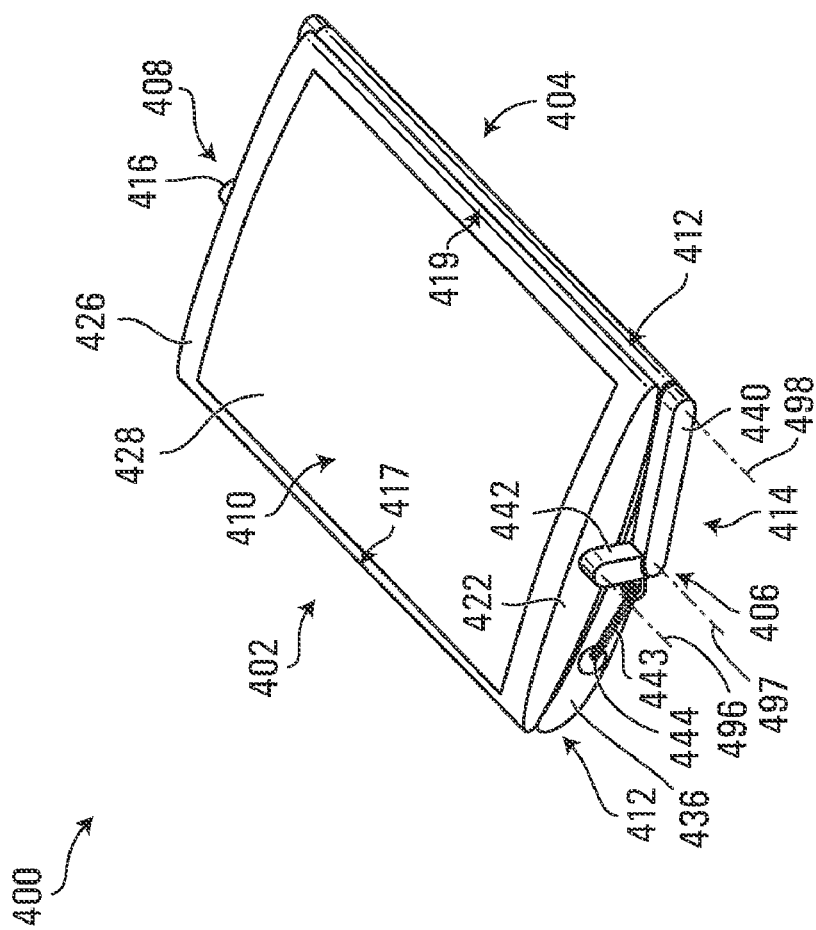
FIG. 4E is a perspective view of the mobile communication device of FIG. 4A in a fully opened position.

The relative length of the long link 440 and the short link 442 link, in this embodiment, may satisfy two conditions. First, the short link may be small enough to stay within the end profile of the device 400 when the device 400 is in either the closed position or the opened position. Specifically, as shown in FIG. 4A, the short link 442 does not protrude above the protective surface 430 or below the base member bottom surface when the device is closed. Also, as shown in FIG. 4E, the short link 442 does not protrude above the top member interface surface 426 or below the base member bottom surface 439 when the device is opened. Second, the combined length of the long link 440 and the short link 442 when extended is sufficient enough to allow for a complete rotation of the top member 410 of the device above the base member 412 as shown in FIG. 4C.

Figure 7:
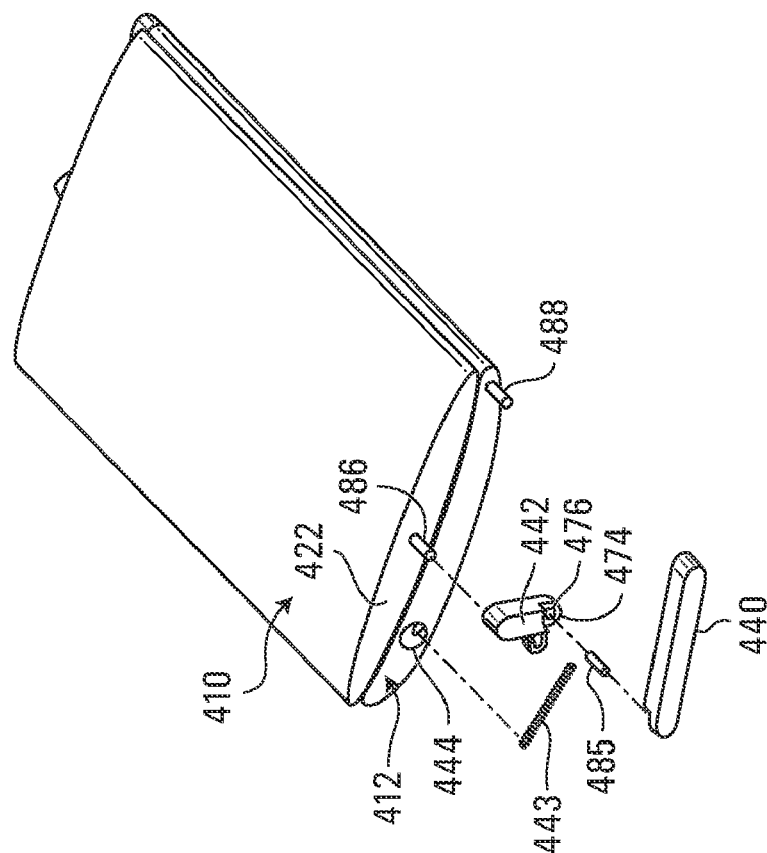
FIG. 7 is a partially exploded perspective view of the mobile communication device of FIG. 4A in the closed position.

FIG. 7 is an enlarged partially exploded perspective view of the device 400 in the closed position. As seen in FIG. 7, the device 400 includes a hinge mechanism pivot pin 485 which is shaped to cooperate with the second long link pivot hole 460 (shown in FIG. 5B) and the first short link pivot hole 476 (shown in FIG. 6A) to form a pin jointer connection or pivot hinge. Alternatively, the hinge mechanism pivot pin 485 could be formed integrally with either the long link 440 or the short link 442 in the same position as the respective second long link pivot hole 460 or first short link pivot hole 476. It is to be understood that any known means of rotatably connecting two members could be utilized in various embodiments to connect the long link 440 and the short link 442, and the specific means described above is only provided as an example of possible rotatable connecting means.

In this embodiment, the device 400 also includes a top pivot pin 486 which extends perpendicularly from the center of the middle of the first top member side surface 422. The top pivot pin 486 and the second short link pivot hole 478 (shown in FIG. 6B) are shaped to cooperate to form a pin jointer connection or pivot hinge. The device 400 also includes a base pivot pin 488 which extends perpendicularly from the first base member side surface 436 near the front base member end 432. The base pivot pin 488 and the long link pivot hole 458 (shown in FIG. 5B) are shaped to cooperate to form a pin jointer connection or pivot hinge. Corresponding pins extend from the top member 410 and the base member 412 at the second device side 408.

The assembly of the device 400 will now be described with reference to FIG. 7. As assembled, the top pivot axis pin 486 is received in the second short link pivot hole 478 (shown in FIG. 6B) to form a first rotatable pin jointer connection hereinafter referred to as a top pivot (not shown) such that the short link 442 is pivotably connected to the top member 410. The top member 410 can rotate about a top rotation axis indicated by dotted line 496 (shown in FIGS. 4A to 4E) which extends through the top pivot axis pin 486 and the top pivot. The base pivot axis pin 488 is received in the first long link pivot hole 458 (shown in FIG. 5B) to form a second rotatable pin jointer connection hereinafter referred to as a base pivot (not shown) such that the long link 440 is pivotably connected to the base member 412. The long link 440 is free to rotate about a base rotation axis indicated by dotted line 498 (shown in FIGS. 4A to 4E) which is parallel to the top rotation axis 496 and extends through the base axis shaft 488 and the base pivot.

The hinge mechanism pivot pin 485 is received in the second long link pivot hole 460 (shown in FIG. 5B) and the first short link pivot hole 476 to form a rotatable pin jointer connection hereinafter referred to as a hinge pivot (not shown). The long link recessed surface 456 (shown in FIG. 5B) and the short link recessed surface 474 are adjacent and the long link 440 and the short link 442 are pivotably connected. The long link 440 and the short link 442 are free to rotate about a linkage rotation axis indicated by dotted line 497 (shown in FIGS. 4A to 4E). The rotation axis 497 extends through the hinge pivot and is parallel to the top rotation axis 496 and the base rotation axis 498. The short link 442 is free to rotate about the linkage rotation axis 497 at least between a position perpendicular to the long link 440 and a position parallel to the long link 440. In this embodiment, the minimum angle between the short link 442 with respect to the long link is restricted due to interference between the short link 442 and the long link 440. Such interference between the two links may prevent undesired over rotation of the short link 442 toward the long link 440.

As assembled, the first hinge mechanism 414 interconnects the top member 410 and the base member 412. Specifically, the long link 440 and the short link 442 are pivotably connected in series and connect the top member 410 and the base member 412. The hinge mechanism 414 is connected to the top member 410 at a first singe point, the top pivot (not shown) and to the base member 412 at a second single point, the base pivot (not shown).

It is to be understood that some embodiments are not limited to those utilizing pin pivot joints to couple a linkage mechanism to top and base members. It is to be understood that any known means of rotatably connecting two members could be utilized in various embodiments to connect the first hinge mechanism 414 to the top member 410 and the base member 412. The specific means of rotatably connecting elements of the hinge mechanism 414 described herein are provided as one example of possible rotatable connecting means.

The first extension spring 443 is attached to the short link spring hook 484 and to the first base spring connection means 444 and biases the top member 410 toward the base member 412 by pulling the short link 442 toward the base member 412. The first extension spring 443 may prevent hyper-extension of the first hinge mechanism 414. Specifically, the first extension spring 443 may prevent the short link 442 from over rotating away from the long link 440. In the closed and fully opened positions (shown in FIGS. 4A and 4E), the short link 442 extends upward away from the hinge pivot (indicated by the rotation axis 497). However, if the short link 442 rotates too far with respect to the long link 440, bend of the first hinge mechanism in the closed and fully opened positioned could be flipped (i.e. the short link extending downward from the hinge pivot. By pulling downward on the short link 442 near the hinge pivot, the extension spring may prevent this over-rotation or hyper-extension. This may help to ensure that the first linkage mechanism is properly situated in the closed and fully opened positions. In some embodiments, the first hinge mechanism may include physical stops near the intersection of the short link 442 and the long link 440, or other mechanisms, to prevent hyper-extension.

The interaction of the elements of the device 400 will now be described with reference to FIGS. 7 and 4A to 4E.

Starting from the closed position shown in FIGS. 4A and 7, the interface surface 426 (shown in FIGS. 4D and 4E) of the top member 410 is adjacent to the upper base member surface 438 (shown in FIGS. 4B to 4D) and is not accessible. The first top member end 417 is aligned with the front device end 404 and the second top member end 419 is aligned with the back device end 402. The first hinge mechanism 414 is in an L-shape, which constitutes a folded position. Specifically, the short link 442 is in a position perpendicular to and above the long link 440. As will be explained below, the first hinge mechanism 414 is in the same position when the device 400 is in the fully opened position shown in FIG. 4E. In this position of the first hinge mechanism 414 (shown in both FIGS. 4A and 7), the length of the extension spring 443 is minimized with comparison to positions between the closed and fully opened positions as can be seen in FIGS. 4A to 4E.

As with the previous embodiment shown in FIGS. 1A to 3, the top member 410 of the device 400 may be moved relative to the base member 412 to the fully opened position (shown in FIG. 4E) by rotating approximately 180 degrees in either the clockwise direction, as described below, or in the counter-clockwise direction.

In order to initiate movement of the device 400 from the closed position shown in FIGS. 4A and 7 to the partially opened position shown in FIG. 4B, a user of the device 400 may simply apply force to the first top member end 417 in a backward, or substantially backward, direction, indicated by the arrow 500. The force may be applied, for example, essentially parallel to the upper base member surface 438 and may be applied near the first top member end 417. The initial force on the top member 410 will push the top member 410 in the backward direction. Because the top member interface surface 426 (shown in FIGS. 4D and 4E) is convexly shaped, and because the upper base member surface 438 is concavely shaped, as the top member 410 moves backward the second top member end 419 is forced upward, thereby initially rotating the top member 410 clockwise about the top rotation axis 496. Also, the short link 442 will rotate about the linkage rotation axis 497 (in the counter-clockwise direction in FIGS. 4A to 4E) to allow the initial movement and rotation of the top member 410.

As the top member 410 rotates about the top rotation axis 496, the device 400 moves from the closed position shown in FIGS. 4A and 7 to the partially opened position shown in FIG. 4B. Turning to FIG. 4B, the first top member end 417 may slide across the upper base member surface 438, thus forcing top member 110 and the top rotation axis 496 upward in a similar manner as the embodiment shown in FIGS. 1A to 3. The long link 440 rotates clockwise about the base rotation axis 498 to allow the movement of the top member 410. The first hinge mechanism 414 will move from the folded position to an expanded position such that the short link 442 is parallel to the long link 440. The first hinge mechanism 414 will then continue to rotate clockwise about the base rotation axis 498 as the first top member end 417 continues to slide across the upper base member surface 438. A moment arm of the force applied to the top member 410, about the top rotation axis 496 is formed and/or increased as the rotation axis point 496 moves upward. However, the applied force may remain parallel, or close to parallel to the upper base member surface 438 or to the forward direction.

During this movement, the first extension spring 443 is stretched from its minimized length due to the movement of the short link 442 away from the base member 412 and exerts a greater force biasing the top member 410 toward the base member 412 and, therefore, biasing the device toward either the closed or fully opened position. Thus, substantially continuous contact or substantially no separation between the top member 410 and the base member 412 may be maintained for at least a part of the movement to the opened position.

As continued force is applied by the user, the device 400 continues to move from the partially opened position shown in FIG. 4B through the intermediately opened position shown in FIG. 4C. Specifically, the top member 410 continues to rotate in the clockwise direction and first hinge mechanism 414 continues to rotate clockwise about the base rotation axis 498 to allow translational movement of the top member 410 in the generally upward direction. The top member 410 (rotating about the rotation axis 496) also moves slightly forward as the first hinge mechanism 414 rotates about the base rotation axis 498.

When the top member 410 has rotated such that it is aligned approximately perpendicularly with respect to the base member 412 (as shown in FIG. 4C), the top rotation axis 496 is maximally displaced from the base member 412. The combined length of the short link 442 and the long link 440 is longer than half the length of the top member 410 (i.e. half the length of the first top member side surface 422). Therefore, the first hinge mechanism 414 is sufficiently long so that top member 410 can continue to rotate through the intermediately opened position shown in FIG. 4C.

With continued force applied to the top member 410, the top member 410 will rotate past the intermediately opened position shown in FIG. 4C toward the almost opened position shown in FIG. 4D. Once the top member 410 passes the intermediately opened position, the first extension spring 443 may provide sufficient biasing force to complete the movement of the device 400 to the fully opened position. Specifically, the biasing force may be sufficient to pull first hinge mechanism 414 back to a contracted position (shown in FIG. 4E). This in turn brings the top member 410 back down to a position adjacent to the base member 412. Therefore, the movement of the top member may be partially driven by the first extension spring 443. In embodiments where the bias force is not present or not sufficient, the user may apply force to continue the rotation of the top member 400 to the fully opened position.

As shown in FIG. 4E, in the fully opened position, the top member 410 again rests against the base member 412. However, in the opened position, the interface surface 426, and, therefore, the touchscreen 428 are accessible. The protective surface 430 (shown in FIGS. 4A to 4C) is adjacent to the base member 412. The top member 410 has effectively been rotated 180 degrees in the clockwise direction in the movement from the closed position (shown in FIG. 4A) to the fully opened position. The second top member end 419 is aligned with the front device end 404 and the first top member end 417 is aligned with the back device end 402. The first hinge mechanism 414 and the second hinge mechanism are in the same position as in the closed position of the device 400 (shown in FIG. 4A).

The top member 410 can be again rotated 180 degrees in the same clockwise direction to move the device 400 from the fully opened position back to the closed position. The user can, for example, apply a similar force to the top member 410 as described above, except the force will be applied at the second top member end 419 in order to close the device. Similar rotation of the top member 410 and similar movement of the first hinge mechanism 414 and the second hinge mechanism 416 will occur. Therefore, the device 400 can be moved from the closed position to the opened position, and from the opened position to the closed position, by using the same movement of the user. As with the embodiment shown in FIGS. 1A to 3, the device 400 may be opened or closed by rotating the top member 410 180 degrees in either direction, and embodiments are not limited to a particular rotation direction. The top member 410 may be rotated up to and through 360 degrees about the top rotation axis 496 of the top member 410 in either the clockwise, or counter clockwise direction.

In this embodiment, a user of the device 400 may again use the same motion, with the thumbs, for example, to provide the force necessary to open and close the device 400. Therefore, the device 400 may also provide a convenient method of opening and closing the device 400 in addition to protecting the touchscreen 428. In addition, as described above, the first extension spring 443 acts as a biasing mechanism to drive part of the rotation of the top member 410 and biases the top member 410 to remain in contact with the base member 412. The first extension spring 443 may, therefore, simplify the opening motion required by a user. Furthermore, the device 400 is the same approximate size in both the closed and fully opened positions shown in FIGS. 4A and 4E respectively.

As with the embodiment shown in FIGS. 1A to 3, the device 400 shown in FIGS. 4A to 7 may be designed to include stable positions between the closed and fully opened positions where the touchscreen 428 is accessible. Similar locking means, or lack of biasing means may be implemented. In addition, a user could open and close the device 400 while holding the device 400 with a single hand in a similar manner as described above with reference to the embodiment shown in FIGS. 1A to 3.

Electrical connections between the top member 410 and the base member 412 could be established using the same methods (e.g. two point contact and/or wireless communication) discussed above with reference to the device 100 shown in FIGS. 1A to 3. Again, inductive charging, could be implemented in the device 400.

Embodiments are not limited to those with pivot type linkage or hinge mechanisms, and some embodiments may implement hinge mechanisms with other types of linkages such as telescoping links, sliding links, etc.

Figure 8E:
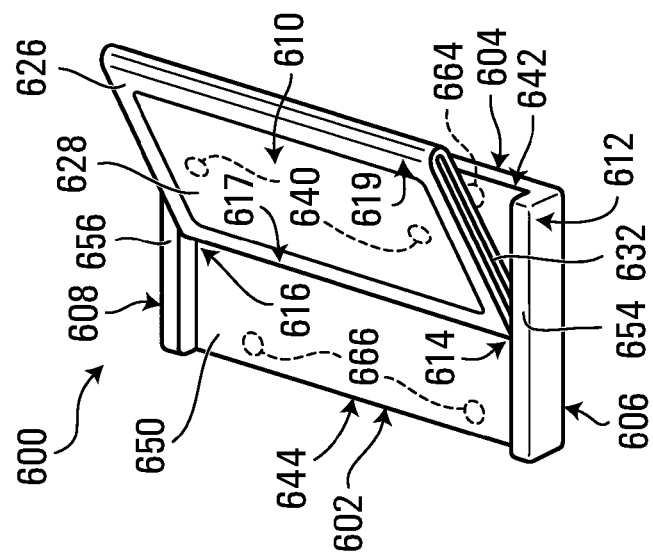
FIG. 8E is a perspective view of the mobile communication device of FIG. 8A in an almost opened position.
Figure 8D:
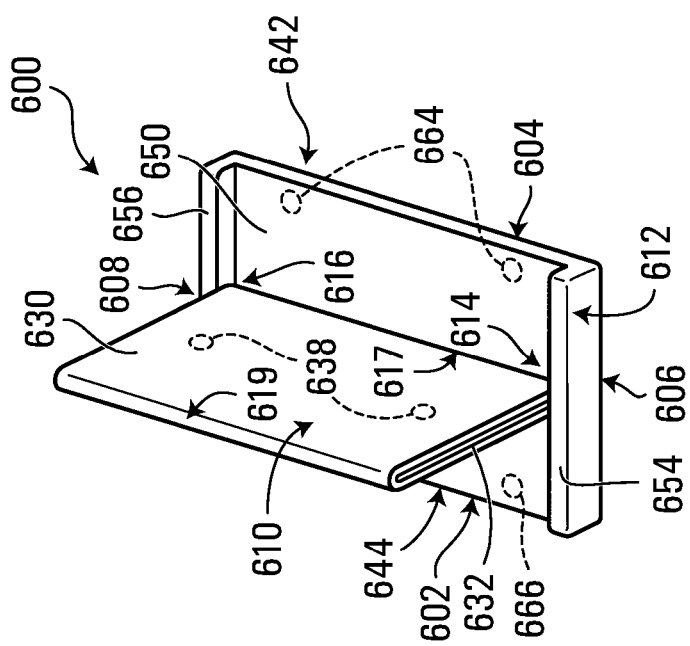
FIG. 8D is a perspective view of the mobile communication device of FIG. 8A in a partially opened position.
Figure 8G:
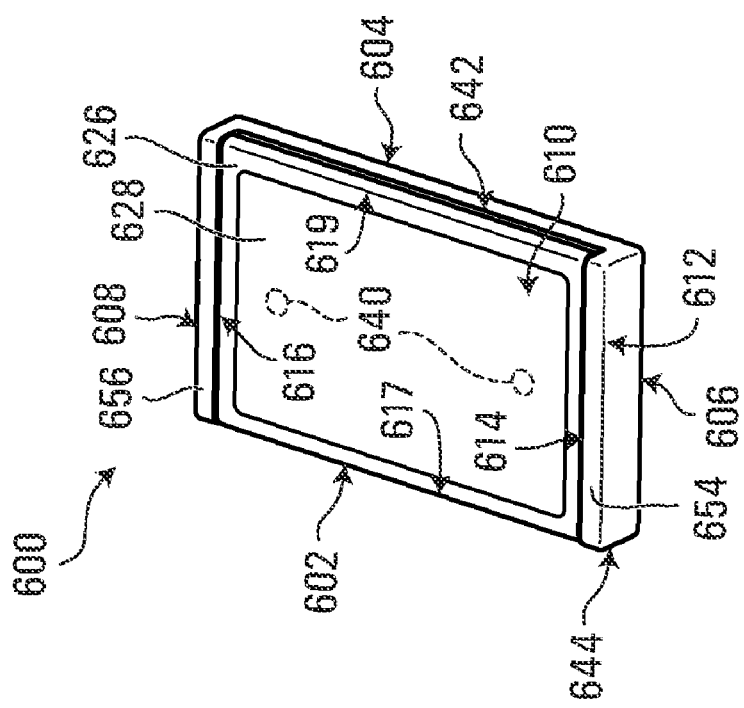
FIG. 8G is a perspective view of the mobile communication device of FIG. 8A in a fully opened position.
Figure 8F:
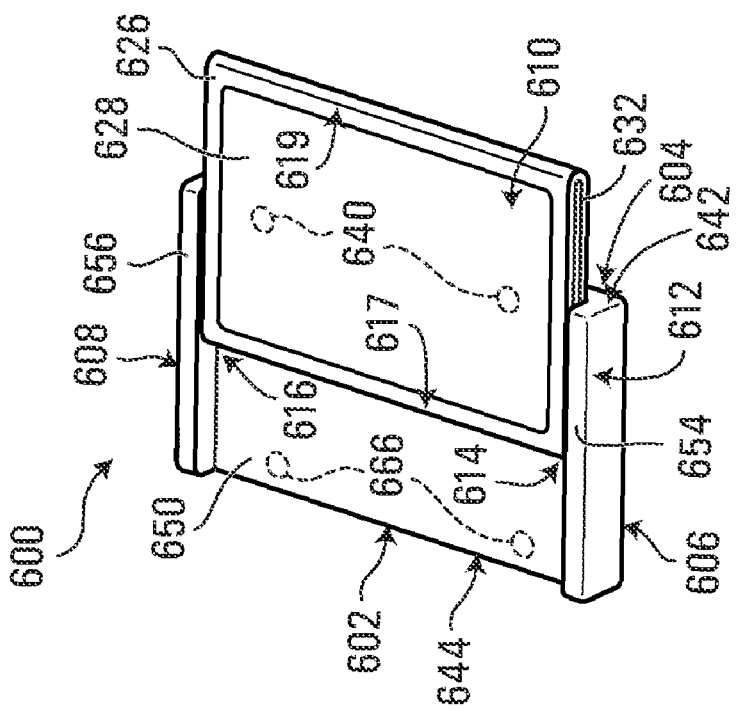
FIG. 8F is a perspective view of the mobile communication device of FIG. 8A in a horizontally displaced opened position.

FIGS. 8A to 8G are perspective views of a device 600 according to a third embodiment which utilizes a sliding-type linkage. FIG. 8A shows the device 600 in a first or fully closed position. FIG. 8B shows the device 600 in a horizontally displaced closed position. FIG. 8C shows the device 600 in an almost closed position. FIG. 8D shows the device 600 in a partially opened position. FIG. 8E shows the device 600 in an almost opened position. FIG. 8F shows the device 600 in a horizontally displaced opened position. FIG. 8G shows the device 600 in a second or fully opened position.

With reference to FIGS. 8A to 8G, the device 600 has a first device end 602, an opposite second device end 604, a first device side 606 and a second device side 608. In this embodiment, the device 600 includes a first or top member 610, a second or base member 612, a first linkage mechanism 614 and a second linkage mechanism 616.

The distance from the first device end 602 to the second device end 604 may be referred to as the length of the device. The distance from the first device side 606 to the second device side 608 may be referred to as the width of the device.

In this embodiment, the length of the device is approximately equal to the length of each of the top member 610 and the base member 612. The direction extending from the first device end 602 to the second device end 604 is referred to herein as the forward direction and the opposite direction is referred to herein as the backward direction. Therefore, the first device end 602, and the opposite second device end 604 are referred to herein as the back device end 602 and the front device end 604 respectively. The direction extending perpendicularly away from the base member 612 toward the top member 610 is referred to herein as the upward direction and the opposite direction is referred to herein as the downward direction. An orientation in the upward and/or downward direction may be referred to as vertical and an orientation in the forward, backward, or sideways direction may be referred to as horizontal. These reference directions are for ease of description and do not require any particular orientation of the elements of the device 600 including the top member 610 and the base member 612.

The first linkage mechanism 614, the top member 610 and the base member 612 are described in more detail with reference to FIGS. 9 and 10 respectively. The assembly of the device 600 is also described with reference to FIGS. 9 and 10. The movement and interaction of the elements of the device 600 will then be described turning back to FIGS. 8A to 8G.

FIG. 9 is a perspective view of the top member 610. In this embodiment, the top member 610 is generally shaped as a flattened rectangular member. The top member 610 includes a first top member end 617, an opposite second top member end 619, a first top member side 622 and an opposite second top member side 624. The first top member end 617 and the second top member end 619 are rounded. The top member 610 also includes a first or interface surface 626 (shown in FIGS. 8E to 8G) which, in this embodiment, is substantially flat and includes a touchscreen 628 (shown in FIGS. 8E to 8G). The top member 610 includes a second or protective surface 630 on an opposite face of the top member 610 from the interface surface 626. The protective surface 630 is also substantially flat.

The first top member side 622 defines a first slider groove 632 which extends essentially along the entire first top member side 622. The first groove 632 extends between a first groove end 634 and a second groove end 636. The first groove end 634 is near the first top member end 617, and the second groove end 636 is near the second top member end 619. A corresponding second slider groove (not shown) is similarly defined in the second top member side 624. The distance between the first groove end 634 and the first top member end 617 is approximately equal to the distance between the first slider groove 632 and either of the interface surface 626 (shown in FIGS. 8E to 8G) and the protective surface 630. Similarly, the distance between the second groove end 636 and the second top member end 619 is also approximately equal to the distance between the first slider groove 632 and either of the interface surface 626 and the protective surface 630. An approximately constant thickness between the first slider groove 632 and the interactive surface 626, protective surface 630, and the first and second top member ends 617/619 is maintained.

Two protective surface magnets 638, which are polarized, are positioned in the top member 610 just below the protective surface 630. The protective surface magnets 638 are shown in dotted lines to indicate that they are hidden by the protective surface 630. One of the protective surface magnets 638 is positioned a distance from the first top member side 622, and the other protective surface magnet 638 is similarly spaced from the second top member side 624. Each of the protective surface magnets 638 is positioned approximately half way between the first top member end 617 and the second top member end 619.

Two interface surface magnets 640 (shown in FIGS. 8E to 8G) are similarly positioned just under the interface surface 626 (shown in FIGS. 8E to 8G). The interface surface magnets 640 are also shown in dotted lines to indicate that they are hidden by the interface surface 626. The protective surface magnets 638 and the interface surface magnets 640 are vertically aligned when the top member 610 is horizontal, such as when the top member 610 is in either the horizontally displaced closed position (shown in FIG. 8B) or the horizontally displaced opened position (shown in FIG. 8F).

The protective surface magnets 638 and the interface surface magnets 640 may each be referred to as first magnets.

FIG. 10 is a perspective view of the base member 612. In this embodiment, the base member 612 is shaped as a flattened rectangular member. The base member 612 includes a front base member end 642, an opposite back base member end 644, a first base member side 646 and an opposite second base member side 648. The front base member end 642 and the back base member end 644 are substantially flat in this embodiment. The base member 612 also includes an upper base member surface 650 (shown in FIGS. 8B to 8D) and a lower base member surface (not shown) opposite to the upper base member surface 650 which are both substantially flat.

The first base member side 646 includes a first ridge 654 and the second base member side 648 includes a second ridge 656. The first ridge 654 and the second ridge 656 each extend above the upper base member surface 650 by a distance approximately equal to the thickness of the top member 610. The first ridge 654 and the second ridge 656 include a first inner ridge side 657 (partially outlined with a dotted line where hidden by the first ridge 654) and a second inner ridge side 658 respectively which are substantially flat and extend upwardly away from, and perpendicular to, the upper base member surface 650. The distance between the first inner ridge side 657 and the second inner ridge side 658 is approximately equal to or slightly greater than the width of the top member 610.

A first slider pin 660 extends inward from the approximate center of the first inner ridge side 657 (partially shown with a dotted line where hidden by the first ridge 654). Similarly, a second slider pin 662 extends inward from the approximate center of the second inner ridge side 658. The first slider pin 660 and the second slider pin 662 are shaped to be slidably received in the first slider groove 632 (shown in FIG. 9) and the second slider groove (not shown) of the top member 610 (shown in FIG. 9) respectfully.

The first slider pin 660 and the second slider pin 662 provide sufficient clearance from the upper base member surface 650 that, when the pins 660/662 are received in the first slider groove 632 and the second slider groove respectively, the top member 610 and the base member 612 do not interfere with each other for horizontal sliding of the top member 610. Clearance is also provided for rotation of the top member 610 about the first slider pin 660 at either the first groove end 634 (shown in FIG. 9) or the second groove end 636 of the first slider groove 632. Rotation clearance for the second slider groove is similarly provided.

The base member 612 of this embodiment further includes two front base magnets 664 and two rear base magnets 666, which are all polarized and positioned in the base member 612 just below the upper base member surface 650. The front base magnets 664 are positioned such that they will be vertically aligned with the protective surface magnets 638 and the interface surface magnets 640 when the device 600 is in the horizontally displaced closed position (shown in FIG. 8B). Similarly, the rear base magnets are positioned, but are spaced on toward the back base member end 644 to be vertically aligned with the protective surface magnets 638 and the interface surface magnets 640 when the device 600 is in the horizontally displaced opened position (shown in FIG. 8F).

The front base magnets 664 and the rear base magnets 666 may each be referred to as second magnets.

The rear base magnets 666, the protective surface magnets 638 (shown in FIG. 9) and the interface surface magnets 640 (shown in FIGS. 8E to 8G) are polarized and arranged to produce a repulsive force such that the top member 610 and the base member 612 push away from each other when rear base magnets 666 are sufficiently proximate to either of the protective surface magnets 638 and the interface surface magnets 640. For example, the rear base magnets 666 and the interface surface magnets 640 are arranged to repel each other sufficiently to push the top member 610 away from the base member 612 when the device 600 is in the horizontally displaced closed position shown in FIG. 8B.

Similarly, the front base magnets 664, the protective surface magnets 638 (shown in FIGS. 8A to 8D) and the interface surface magnets 640 (shown in FIGS. 8E to 8G) are arranged to produce a repulsive force such that the top member 610 and the base member 612 push away from each other when front base magnets 664 are sufficiently proximate to either of the protective surface magnets 638 or the interface surface magnets 640. For example, the front base magnets 664 and the protective surface magnets 638 are arranged to repel each other sufficiently to push the top member 610 away from the base member 612 when the device 600 is in the horizontally displaced opened position (shown in FIG. 8F).

Thus, each of the front base magnets 664 (shown in FIGS. 8E to 8G) and the rear base magnets 666 in conjunction with either the protective surface magnets 638 (shown in FIGS. 8A to 8D) or the interface surface magnets 640 form a magnetic biasing means to push the top member 610 away from the base member 612.

A person skilled in the art will appreciate that the front base magnets 664, the rear base magnets 666, the protective surface magnets 638 (shown in FIG. 9) and the interface surface magnets 640 (shown in FIGS. 8E to 8G) could be arranged in various ways to produce the repulsive forces described above. For example, each of the front base magnets 664, the rear base magnets 666, the protective surface magnets 638, and the interface surface magnets 640 could be arranged with a south pole most adjacent to a respective of the upper base member surface 650, the protective surface 630 (shown in FIG. 9), and the interface surface 626 (shown in FIGS. 8E to 8G).

It is to be understood that magnets such as the front base magnets 664, the rear base magnets 666, the protective surface magnets 638 (shown in FIG. 9) and the interface surface magnets 640 (shown in FIGS. 8E to 8G) may be flush with respective surfaces of the a device in some embodiments, and embodiments are not limited to those where such magnets are just under and/or hidden by respective surfaces.

The assembly of the device 600 will now be described with respect to FIGS. 9 and 10. The first slider pin 660 and the second slider pin 662 of the base member 612 are slidably received in the first slider groove 632 and the second slider groove (not shown) of the top member 610 respectively. The first slider pin 660 and the second slider pin 662 are restricted to movement within the first slider groove 632 and the second slider groove respectfully. In other words, the movement of the top member 610 with respect to the base member 612 is restricted by the interaction of the first slider pin 660 and the second slider pin 662 and the respective first slider groove 632 and the second slider groove. Thus, the first slider pin 660 and the first slider groove 632, as assembled, form the first linkage mechanism 614 (shown in FIGS. 8A to 8G), while the second slider pin 662 and the second slider groove, as assembled, form the second linkage mechanism 616 (shown in FIGS. 8A to 8G). Each of the first and second linkage mechanisms 614/616 connect the top member 610 to the bottom member 612 at a point (the first slider pin 660 and the second slider pin 662) which is stationary with respect to the base member 612.

The interaction of the elements of the device 600 will now be explained with reference to FIGS. 8A to 8G. The second linkage mechanism 616 essentially mirrors the first linkage mechanism 614 in form and function, but is disposed opposite to the first linkage mechanism 614 near the second device side 608. For simplicity and clarity, only the interaction of the first linkage mechanism 614 (i.e. the first slider groove 632 and the first slider pin 660 shown in FIG. 10) is described below, although it is to be understood that the following description of the first linkage mechanism 614 also applies to the mirrored second linkage mechanism 616.

Starting from the closed position shown in FIG. 8A the interface surface 626 (shown in FIGS. 8E to 8G) of the top member 610 is adjacent to the upper base member surface 650 (shown in FIGS. 8B to 8F). Therefore, the protective surface 630 (shown in FIGS. 8A to 8D) is exposed, and the interface surface 626 is not accessible and may be protected from being scratched or otherwise damaged. The first top member end 617 is aligned with the front device end 604 and the second top member end 619 is aligned with the back device end 602. The front base member end 642 is aligned with the front device end 604 and the back top member end 644 is aligned with the back device end 602.

As with the previous embodiments shown in FIGS. 1A to 7, the top member 610 of the device 600 may be moved relative to the base member 612 to the fully opened position (shown in FIG. 8G) by movement including a rotation of approximately 180 degrees in either the clockwise direction, as described below, or in the counter-clockwise direction.

In order to initiate movement of the device 600 from the closed position to the fully opened position (shown in FIG. 8G) a user may first move the device to the horizontally displaced closed position (shown in FIG. 8B) by sliding the top member 610 in the backward direction with respect to the base member 612. For example, the user may simply apply force to the first top member end 617 in a backward direction.

The backward movement of the top member 610 is stopped by the interaction of the first slider pin 660 (shown in FIG. 10) with the first groove end 634 (shown in FIG. 9) when the device 600 has been moved to the horizontally displaced closed position shown in FIG. 8B. In this position, the top member 610 is now free to rotate (in the clockwise direction in FIGS. 8A to 8G) about the first slider pin 660 and the second slider pin 662 (shown in FIG. 10). Specifically, the top member 610, as shown in FIG. 8B, may rotate from the horizontally displaced closed position shown in FIG. 8B towards the almost closed position shown in FIG. 8C. The first top member end 617 will be restricted from moving away from the second member 612 by the first and second slider pins 660/662.

In the horizontally displaced closed position shown in FIG. 8B, the interface surface magnets 640 of the top member 610 (shown in FIGS. 68E to 8G) are almost adjacent to, and are vertically aligned with, the rear base magnets 666 (shown in FIGS. 8D to 8F) of the base member 612. As mentioned above, interface surface magnets 640 and the rear base magnets 666 are arranged to repel each other when aligned and adjacent, and therefore, the top member 610 and the base member 612 repel each other when in the horizontally displaced closed position. This repulsive force drives initial rotation of the top member 610 away from the base member toward the almost closed position shown in FIG. 8C. Thus, this magnetic biasing mechanism (the interface surface magnets 640 the rear base magnets 666 in this case) drives a portion of the rotational movement of the top member 610.

The repulsive force between the interface surface magnets 640 and the rear base magnets 666 (shown in FIGS. 8E to 8G) may be strong enough in some embodiments to further drive rotation of the top member 610 away from the base member 612 through the almost closed position shown in FIG. 8C toward the partially opened position shown in FIG. 8D. Alternatively, the user can assist the rotation of the top member 610 to the partially opened position shown in FIG. 8D.

From the partially opened position shown in FIG. 8D, the user can force the top member 610 to continue to rotate the top member 610 in the clockwise direction through the almost opened position shown in FIG. 8E. From the almost opened position shown in FIG. 8E, the user can apply a downward and horizontal force to push the top member 610 to a position parallel with the base member 612, but horizontally offset in the forward direction with respect to the base member 612. This constitutes the horizontally displaced opened position shown in FIG. 8F. In the horizontally displaced opened position, the interface surface 626, rather than the protective surface 630 (shown in FIGS. 8A to 8D) is exposed. In the horizontally displaced opened position, the top member 610 and the base member 612 again repel each other, as described above. Therefore, a user may overcome this repulsive force to move the device to the horizontally displaced opened position.

When the device is in the horizontally displaced opened position shown in FIG. 8F, the user may apply a backward force to the top member 610 to slide the top member 612 in the backwards direction. The top member 610 will then move from the horizontally displaced opened position shown in FIG. 8F to the fully opened position shown in FIG. 8G.

As shown in FIG. 8G, in the fully opened position, the top member 610 again rests against the base member 612. However, in the opened position, the interface surface 626, and, therefore, the touchscreen 628, is accessible. The protective surface 630 (shown in FIGS. 8A to 8D) is adjacent to the base member 612. The top member 610 has effectively been rotated 180 degrees in the clockwise direction in the movement from the closed position (shown in FIG. 8A) to the fully opened position. The second top member end 619 is aligned with the front device end 604 and the first top member end 617 is aligned with the back device end 602. As can be seen in FIGS. 8A and 8G, the device 600 is the same approximate size in both the closed and fully opened positions.

As can be seen in FIGS. 8A to 8G, the top member 610 is restricted in movement by the first slider pin 660 and the second slider pin 662 (both shown in FIG. 10), such that there is substantially no separation between the top member 610 and the base member 612 during movement between the fully closed and fully opened positions. There may be a slight gap between the top member 610 and the base member 612 in some embodiments, or the top member 610 and the base member 612 may be in contact for some or all of the movement. Restricting the movement and position of the top member 610 in this fashion may serve to make movement of the device between opened and closed positions easier to control with a single hand or using two hands as the top member 610 may not move completely away from the base member 612 in an uncontrolled manner.

In some embodiments, the device 600 may further include a locking or bias mechanism to define a stable position of the top member 610 when the device is in the fully opened or fully closed position (shown in FIGS. 8A and 8G respectively) although embodiments are not so limited.

A movement from closed to open, including a clockwise 180 degree rotation of the top member 610, to open the device 600 has been described above. To open the device 600 by moving the top member 610 in the opposite direction, a user may initially slide the top member 610 in the forwards direction, rather than in the backwards direction as described above. As described above, interactive surface magnets 640 (shown in FIGS. 8E to 8G) and the front base member magnets 664 (shown in FIGS. 8B to 8E) are arranged such that the top member 610 and the base member 612 will repel each other to partially assist the initial rotation in the counter-clockwise direction. Similarly, movements as described above, but in the reverse direction will then finish the movement of the device to the fully opened position shown in FIG. 8G.

Similarly, the top member 610 can be again moved in a similar fashion as described above to move the device 600 from the fully opened position back to the closed position. The top member may also be moved in either the clockwise or the counter clockwise direction to close the device. Thus, the top member 610 may be rotated 360 degrees in total by means of two consecutive rotating movements of the top member 610, similar to that described above, in the same direction.

As described, the repelling arrangement of the front base magnets 664 (shown in FIGS. 8B to 8E) and the rear base magnets 666 and with respect to the protective surface magnets 638 (shown in FIGS. 8A to 8D) and the interface surface magnets 640 (shown in FIGS. 8E to 8G) form a magnetic mechanism to partially assist rotation of the top member 610 when opening or closing the device 600. In some embodiments, interface surface magnets, protective surface magnets and base magnets may be arranged to attract, rather than repel, top and base members to assist with at least a portion of the rotation of the top member. The repelling arrangement of the magnets described above is only provided as an example of how magnetic mechanism could be implemented to assist rotation of the top member.

Some embodiments may comprise more or less polarized magnets in the top and bottom members, and embodiments are not limited to those providing enough magnets to partially drive the rotation of a device in two opposite directions. For example, the front base magnets 664 (shown in FIGS. 8B to 8E) could be omitted in some embodiments and only one or more first magnet and one or more second magnet could be present for each of the top member 610 and the base member 612.

As with the other embodiments described herein, the touchscreen 628 (shown in FIGS. 8E to 8G) may be accessible in other positions between the closed and the fully opened positions, and the device 600 may include means to lock the top member 610 in one or more positions in addition to the closed position and the fully opened position. Also, as with the other embodiments described herein, the size and shape of the elements of the device 600 is not limited to those shown in FIGS. 8A to 10, and some embodiments may utilize elements of different size and/or shape.

Although not described in detail herein, other embodiments may implement still further linkage or hinge mechanism, top member, and base member configurations to achieve the same functions. For example, in some embodiments, the top and base members may be different sizes. Some embodiments may utilize more or less linkage mechanisms than the embodiments shown in the Figures. The linkage mechanisms may comprise more or less pivotably connected links than shown in the Figures. One or more linkage mechanisms could be disposed toward the center of the device and could operate to rotate one or more halves of a top member together or separately. Other features including, but not limited to, electronic connections, locking mechanisms, interface elements, trims, etc. could be utilized without departing from the scope of this application.

Electrical connections and communication between the device 600 could be implemented in various ways including those described above with reference to the other embodiments shown in FIGS. 1 to 7.

What has been described is merely illustrative of the application of the principles of some embodiments. Other arrangements and methods can be implemented by those skilled in the art without departing from the spirit and scope of the application.

The invention claimed is:

1. A mobile communication device comprising:
   a first member having a first surface and a second surface opposite to the first surface;
   a second member;
   at least one linkage mechanism interconnecting the first member and the second member whereby the first member and the second member can be moved relative to each other between a first position and a second position; and
   a biasing mechanism which provides a biasing force that drives at least a portion of a rotation of the first member between the first position and the second position, wherein
   the first member overlies the second member in both the first position and the second position,
   the first surface is inaccessible and the second surface is accessible when the device is in the first position, and
   the first surface is accessible and the second surface is inaccessible when the device is in the second position.

2. The device of claim 1, wherein the at least one linkage mechanism allows rotation of the first member in a same direction of rotation for both movement from the first to the second position and movement from the second position to the first position.

3. The device of claim 1, wherein the at least one linkage mechanism is moveable from a folded position to an expanded position to allow the first member to move from the first position to the second position and from the second position to the first position.

4. The device of claim 1, wherein the at least one linkage mechanism slidably and rotatably connects the first member to the second member.

5. The device of claim 1, wherein the biasing mechanism biases the first member toward the second member, thereby driving said at least a portion of the movement between the first position and the second position.

6. The device of claim 1, wherein the biasing mechanism comprises a mechanical biasing mechanism.

7. The device of claim 6, wherein the mechanical biasing mechanism comprises one or more springs.

8. The device of claim 1, wherein the biasing mechanism comprises a magnetic biasing mechanism.

9. The device of claim 8, wherein the magnetic biasing mechanism comprises at least one first magnet in the first member, and at least one second magnet in the second member.

10. The device of claim 9, wherein a magnetic force between the at least one first magnet and the at least one second magnet drives the at least a portion of movement of the device between the first position and the second position.

11. A mobile communication device comprising:
- a first member having a first surface and a second surface opposite to the first surface;
- a second member; and
- at least one linkage mechanism interconnecting the first member and the second member whereby the first member and the second member can be moved relative to each other between a first position and a second position, the first member and the second member being biased or restricted such that there is substantially no separation between the first member and the second member during movement between the first and second positions, wherein
- the first member overlies the second member in both the first position and the second position,
- the first surface is inaccessible and the second surface is accessible when the device is in the first position, and
- the first surface is accessible and the second surface is inaccessible when the device is in the second position wherein the at least one linkage mechanism allows rotation of the first member in a same direction of rotation for both movement from the first to the second position and movement from the second position to the first position.

12. The device of claim 11, wherein the first member is biased to remain in contact with the second member during movement between the first and second positions.

13. The device of claim 11, wherein the at least one linkage mechanism can move from a folded position to an expanded position to allow the first member to move from the first position to the second position and from the second position to the first position.

14. The device of claim 12, wherein the first member is biased towards the second member, thereby biasing the first member to remain in contact with the second member during movement between the first and second positions.

15. The device of claim 11, wherein the first member and the second member are biased by a mechanical biasing mechanism.

16. The device of claim 15, wherein the mechanical biasing mechanism comprises at least one spring.

17. The device of claim 11, wherein each least one linkage mechanism connects the first member to the second member at a point which is stationary with respect to the second member.

18. The device of claim 17, wherein the at least one linkage mechanism slidably and rotatably engages the first member to the second member at said point.

19. A method of rotatably coupling a first member and a second member of a mobile communication device:
- rotatably connecting the first member to at least one linkage mechanism;
- connecting the at least one linkage mechanism to the second member such that the first member can be moved relative to the second member between a first position and a second position; and
- biasing the first member to move at least partially between the first position and the second position, wherein
- the first member overlies the second member in both the first position and the second position,
- the first surface is inaccessible and the second surface is accessible when the device is in the first position, and
- the first surface is accessible and the second surface is inaccessible when the device is in the second position, and
- said biasing provides a biasing force that drives at least a portion of a rotation of the first member between the first position and the second position.

* * * * *